（12) United States Patent
Gupta et al.

(10) Patent No.: US 10,719,562 B2
(45) Date of Patent: Jul. 21, 2020

(54) DISTRIBUTED AND FAST DATA STORAGE LAYER FOR LARGE SCALE WEB DATA SERVICES

(71) Applicant: BloomReach Inc., Mountain View, CA (US)

(72) Inventors: Prateek Gupta, Mountain View, CA (US); Praveen K. Patnala, Santa Clara, CA (US); Amit Aggarwal, Los Altos, CA (US); Ashutosh Garg, Sunnyvale, CA (US); Gurashish Singh Brar, South San Francisco, CA (US); Kannan Nitin Sharma, San Jose, CA (US); Manojit Sarkar, Fremont, CA (US); Shao-Chuan Wang, Santa Clara, CA (US)

(73) Assignee: BloomReach Inc., Mountain View, CA (US)

( * ) Notice: Subject to any disclaimer, the term of this patent is extended or adjusted under 35 U.S.C. 154(b) by 148 days.

(21) Appl. No.: 14/567,684

(22) Filed: Dec. 11, 2014

(65) Prior Publication Data

US 2015/0169624 A1    Jun. 18, 2015

Related U.S. Application Data

(60) Provisional application No. 61/916,061, filed on Dec. 13, 2013.

(51) Int. Cl.
*G06F 16/951* (2019.01)
*G06F 16/958* (2019.01)

(52) U.S. Cl.
CPC .......... *G06F 16/951* (2019.01); *G06F 16/958* (2019.01)

(58) Field of Classification Search
None
See application file for complete search history.

(56) References Cited

U.S. PATENT DOCUMENTS

| | | |
|---|---|---|
| 6,014,669 A | 1/2000 | Slaughter et al. |
| 6,557,076 B1 | 4/2003 | Copeland et al. |
| 6,714,980 B1 | 3/2004 | Markson et al. |
| 6,721,764 B2 | 4/2004 | Hitz et al. |
| 7,246,200 B1 | 7/2007 | Van Rietschote et al. |
| 7,725,763 B2 | 5/2010 | Vertes et al. |

(Continued)

FOREIGN PATENT DOCUMENTS

| | | |
|---|---|---|
| WO | 2011069664 | 6/2011 |
| WO | 2011069665 | 6/2011 |

OTHER PUBLICATIONS

Jong Woong Hyun, URI-Sniffing Based Load Balancing on Clustered Web Servers, May 27, 2003.

(Continued)

*Primary Examiner* — Neveen Abel Jalil
*Assistant Examiner* — Irene Baker
(74) *Attorney, Agent, or Firm* — Moser Taboada

(57) ABSTRACT

Techniques for providing a distributed and fast data storage layer for large scale web data services are disclosed. In some embodiments, a distributed data storage layer for web data services includes storing web related data for a plurality of merchants in the distributed data storage layer; and copying on demand a data store and a search index for web related data for a first merchant to perform a job for updating the web related data for the first merchant.

20 Claims, 9 Drawing Sheets

(56) References Cited

U.S. PATENT DOCUMENTS

| | | |
|---|---|---|
| 7,774,568 B2 | 8/2010 | Sudhakar |
| 7,882,068 B2 | 2/2011 | Schack et al. |
| 8,200,632 B2 | 6/2012 | Schack et al. |
| 8,495,112 B2 | 7/2013 | Adkins et al. |
| 8,645,650 B2 | 2/2014 | Brassow |
| 8,713,270 B2 | 4/2014 | Havewala et al. |
| 8,732,698 B2 | 5/2014 | Ling et al. |
| 8,843,624 B2 | 9/2014 | Britsch et al. |
| 8,863,096 B1 | 10/2014 | Bucur et al. |
| 9,699,017 B1* | 7/2017 | Gupta ................. H04L 67/1095 |
| 2002/0007404 A1* | 1/2002 | Vange ................. H04L 67/1008 |
| | | 709/217 |
| 2002/0059170 A1* | 5/2002 | Vange .................... G06F 9/5027 |
| 2003/0083956 A1* | 5/2003 | Freeny, Jr. ............. G06Q 20/20 |
| | | 705/14.35 |
| 2003/0105768 A1* | 6/2003 | Berkowitz ............ G06F 16/273 |
| 2003/0149373 A1 | 8/2003 | Reade et al. |
| 2005/0038833 A1 | 2/2005 | Colrain et al. |
| 2005/0050028 A1* | 3/2005 | Rose ...................... G06Q 30/02 |
| 2006/0168259 A1 | 7/2006 | Spilotro et al. |
| 2007/0088819 A1* | 4/2007 | Sinha ................. G06Q 10/0637 |
| | | 709/224 |
| 2007/0124476 A1* | 5/2007 | Oesterreicher ..... H04L 67/1008 |
| | | 709/226 |
| 2007/0294197 A1 | 12/2007 | Jackson |
| 2008/0091806 A1* | 4/2008 | Shen ...................... G06F 9/5061 |
| | | 709/223 |
| 2008/0097996 A1* | 4/2008 | Dias .................... G06F 16/2379 |
| 2008/0104100 A1* | 5/2008 | Richardson ........... G06F 16/951 |
| 2009/0037367 A1* | 2/2009 | Wein ..................... G06F 9/5061 |
| 2009/0106216 A1* | 4/2009 | Gutlapalli ............. G06F 16/328 |
| 2009/0204650 A1 | 8/2009 | Wong et al. |
| 2012/0054771 A1* | 3/2012 | Krishnamurthy ..... G06F 9/4881 |
| | | 718/105 |
| 2012/0158662 A1 | 6/2012 | Buragohain et al. |
| 2013/0073473 A1* | 3/2013 | Heath .................... G06Q 30/02 |
| | | 705/319 |
| 2013/0179480 A1 | 7/2013 | Agarwal et al. |
| 2013/0218840 A1* | 8/2013 | Smith .................. G06F 11/1446 |
| | | 707/639 |
| 2013/0254181 A1* | 9/2013 | Balassanian .......... G06F 16/951 |
| | | 707/709 |
| 2013/0304761 A1 | 11/2013 | Redlich et al. |
| 2013/0332460 A1* | 12/2013 | Pappas .............. G06F 17/30705 |
| | | 707/740 |
| 2014/0156777 A1* | 6/2014 | Subbiah .............. H04L 67/1097 |
| | | 709/213 |
| 2014/0244584 A1* | 8/2014 | Song ....................... G06F 3/067 |
| | | 707/627 |
| 2014/0278573 A1* | 9/2014 | Cook .................... G06F 16/256 |
| | | 705/4 |
| 2014/0282596 A1* | 9/2014 | Bourbonnais ............. G06F 9/46 |
| | | 718/105 |
| 2014/0310259 A1* | 10/2014 | Tian .................... G06F 16/2471 |
| | | 707/718 |

OTHER PUBLICATIONS

Zachary Nathaniel Joseph Peterson, Data Placement for Copy-On-Write Using Virtual Contiguity, University of California, Santa Cruz, Sep. 2002.

Bhavana Shah, Disk Performance of Copy-On-Write Snapshot Logical Volumes, Aug. 2006.

Emeneker et al., Dynamic Virtual Clustering with Xen and Moab, Frontiers of High Performance Computing and Networking, ISPA 2006 Workshops.

Shvachko et al., The Hadoop Distributed File System, Mass Storage Systems and Technologies (MSST), 2010.

Ghemawat et al., The Google File System, SOSP '03 Proceedings of the Nineteenth ACM Symposium on Operating Systems Principles, Dec. 2003.

Clement et al., Upright Cluster Services, SOSP '09 Proceedings of the ACM SIGOPS 22nd Symposium on Operating Systems Principles, 2009.

* cited by examiner

DISTRIBUTED AND FAST DATA STORAGE LAYER FOR LARGE SCALE WEB DATA SERVICES

CROSS REFERENCE TO OTHER APPLICATIONS

This application claims priority to U.S. Provisional Patent Application No. 61/916,061, entitled DISTRIBUTED AND FAST DATA STORAGE LAYER FOR LARGE SCALE WEB DATA SERVICES filed Dec. 13, 2013, which is incorporated herein by reference for all purposes.

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web.

Internet-based web services can be delivered through web sites on the World Wide Web (WWW). Web pages are often formatted using HyperText Markup Language (HTML), eXtensible HTML (XHTML), or using another language that can be processed by a web browser that is typically executed on a user's client device, such as a computer, tablet, phablet, smart phone, smart watch, smart television, or other (client) device. A web site can be hosted on a web server that is typically accessible via a network, such as the Internet, through a web address, which is generally known as a Uniform Resource Indicator (URI) or a Uniform Resource Locator (URL).

Search engines can be used to facilitate searching of web services, such as to identify relevant web sites for particular content and/or services on the World Wide Web. Search engines (e.g., web-based search engines provided by various vendors, including, for example, Google, Microsoft Bing, and Yahoo) provide for searches of online information that includes searchable content (e.g., digitally stored electronic data), such as searchable content available via the World Wide Web. As input, a search engine typically receives a search query (e.g., query input including one or more terms, such as keywords, by a user of the search engine). The search engine performs the search for the search query and outputs results that are typically presented in a ranked list, often referred to as search results or hits (e.g., links or Uniform Resource Locators (URLs) for one or more web pages and/or web sites). The search results can include web pages, images, audio, video, database results, directory results, information, and other types of data.

Search engines typically provide paid search results (e.g., the first set of results in the main listing and/or results often presented in a separate listing on the right side of the output screen). For example, advertisers may pay for placement in such paid search results based on keywords (e.g., keywords in search queries). Search engines also typically provide organic search results, also referred to as natural search results. Organic search results are based on various algorithms employed by different search engines that attempt to provide relevant search results based on a received search query.

For improved Internet marketing, search engine optimization (SEO) has developed as a form of industry/technical consulting (often referred to as search engine optimizers) provided to web site operators (e.g., vendors of products/services with web sites and/or e-commerce vendors of products/services) for improving the volume or quality of traffic to a web site from a search engine via organic search results (e.g., to improve the web site's web presence as a paid service engagement or pursuant to a marketing campaign). Generally, the higher a web site appears in the organic search results list, the more users it will receive from the search engine. SEO can target different kinds of searches, including image searches, local searches, and industry specific, vertical search engines to improve the web site's web presence. For example, SEO often considers how search engines work and what people search for to recommend web site related changes to optimize a web site (e.g., which primarily involves editing its content and HyperText Markup Language (HTML) coding to both increase its relevance to specific keywords and to remove barriers to the indexing activities of search engines).

BRIEF DESCRIPTION OF THE DRAWINGS

Various embodiments of the invention are disclosed in the following detailed description and the accompanying drawings.

DETAILED DESCRIPTION

Figure 1:
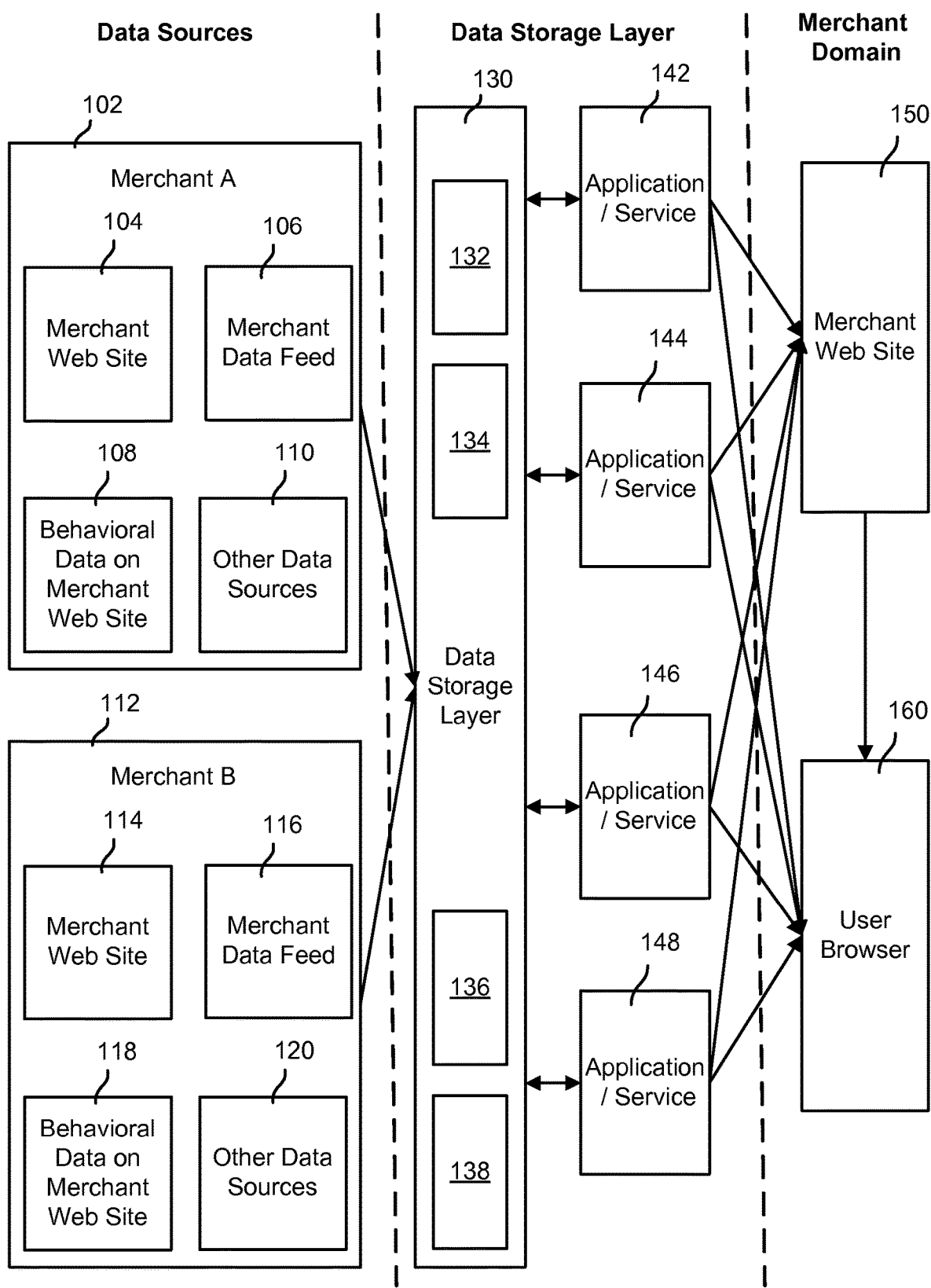
FIG. 1 is a functional block diagram illustrating an overview of an architecture for providing a distributed and fast data storage layer for large scale web data services in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Many vendors provide big data applications that can use content from a variety of data sources, such as a merchant domain, web-wide data, and/or data from other sources. This generally requires storing information so that it is easily accessible by several different applications and possibly several different customers. However, such presents particular technical challenges to provide such data in a scalable, reliable, and fast response time manner.

What is needed are new techniques for providing a data storage layer that can support large scale data applications that can use content from a variety of data sources, such as a merchant domain, web-wide data, and/or data from other sources (e.g., to optimize customer acquisition and experiences). Thus, there is a need for a distributed and fast data storage layer for large scale web data services.

Accordingly, techniques for providing a distributed and fast data storage layer for large scale web data services are disclosed. In some embodiments, a distributed and fast data storage layer for large scale web data services is disclosed for implementing techniques for storing, retrieving, and searching information about web pages, such as further described below. In some embodiments, a system for a distributed data storage layer for web data services includes the distributed data storage layer for storing web related data for a plurality of merchants; and a copy on demand dynamic cluster including a data store and a search index for storing web related data for a first merchant to perform a job for updating the web related data for the first merchant using a processor.

For example, the copy on demand dynamic cluster can include the data store and the search index for storing the web related data for the first merchant corresponds to a snapshot of the data store and the index stored in the dynamic cluster of the distributed data storage layer. The web related data for the plurality of merchants can be stored in a back-end cluster of the distributed data storage layer. In some cases, the web related data can include crawled web site data, feed data, and user behavior data.

In some embodiments, the system for a distributed data storage layer for web data services further includes an application that is in communication with the distributed data storage layer and a web site associated with the first merchant (e.g., the application can also be in communication with a user browser).

In some embodiments, the system for a distributed data storage layer for web data services further includes a merge product information engine for merging crawled web site data and feed data for each of the plurality of merchants (e.g., the merge product information engine can maintain data consistency for the crawled web site data and feed data for each of the plurality of merchants).

In some embodiments, the system for a distributed data storage layer for web data services further includes a product attribute computation engine for reading crawl related product attribute data and feed related product data stored in a data store of the distributed data storage layer and for computing crawl related product attribute data and feed related product data for each of the plurality of merchants, in which the merged crawl related product attribute data and feed related product data for each of the plurality of merchants is stored in the data store of the distributed data storage layer.

In some embodiments, the system for a distributed data storage layer for web data services further includes a back-end job manager for delegating jobs for processing by a back-end cluster or a copy on demand dynamic cluster.

In some embodiments, the system for a distributed data storage layer for web data services further includes a resource aware adaptive capacity/throttling engine for determining resource requirements for performing back-end job processing based on one or more rules.

In some embodiments, the system for a distributed data storage layer for web data services further includes a resource manager for optimizing a cluster size for a back-end cluster and/or the copy on demand dynamic cluster for performing back-end job processing.

In some embodiments, the system for a distributed data storage layer for web data services further includes a front-end cluster for storing a subset of the web related data for each of the plurality of merchants in the distributed data storage layer.

In some embodiments, a method for a distributed data storage layer for web data services includes storing web related data for a plurality of merchants in the distributed data storage layer; and copying on demand a data store and a search index for web related data for a first merchant to perform a job for updating the web related data for the first merchant.

For example, various techniques are disclosed for storing, retrieving, and searching information about web data (e.g., web pages) for a merchant's web site in accordance with some embodiments. A merchant as used herein generally refers to a third party entity that uses a web site (e.g., on the World Wide Web (WWW)) to engage with customers and/or to buy and sell products and/or services. A data feed as used herein generally refers to a data object (e.g., a file) that includes a list of products/services that use groupings of attributes that define or identify each one of a merchant's products/services in a unique way. Response time for a service as used herein generally refers to a time interval between a time that a request is received and a response is sent. Referrer URL generally refers to the URL of the web page that preceded the page in question.

In some embodiments, a distributed data storage layer is disclosed that provides a new and improved way of storing and searching web documents for multiple third party merchant domains from multiple data sources including World Wide Web information. For example, the distributed data storage layer disclosed herein can provide a consistent (e.g., facilitating data consistency for maintained merchant data using various data consistency processing techniques, such as further described herein), accurate, and real-time (e.g., near real-time, such as further described herein) view of third party merchant content that can be derived from multiple data sources, such as web pages on a web site, data from a merchant data feed, and/or data from user behavior on a merchant's web site. In an example implementation, the distributed data storage layer can also provide fast and guaranteed performance in terms of "response time." In this example implementation, the data is also available in a consistent and fast manner across geographic locations, such as US East, US West, EU West, and/or other geographic locations.

These and various other techniques for a distributed and fast data storage layer for large scale web data services are further described below.

FIG. 1 is a functional block diagram illustrating an overview of an architecture for providing a distributed and fast data storage layer for large scale web data services in accordance with some embodiments. FIG. 1 provides an exemplary architecture that can be implemented using various computing hardware and performing various processes as will be further described below.

Referring to FIG. 1, data sources include various merchant data, such as merchant data for a Merchant A shown as 102 and a Merchant B shown as 112. Merchant A data can include a merchant web site 104, a merchant data feed 106, behavioral data on the merchant web site 108, and various other data sources 110 (e.g., various other web data sources including search logs, social media data sources, and/or other data sources). Similarly, Merchant B data can include a merchant web site 114, a merchant data feed 116, behavioral data on the merchant web site 118, and various other data sources 120.

As also shown in FIG. 1, a data storage layer includes a data storage layer 130 and a plurality of applications/services. For example, the data storage layer is in communication with each of the merchant data sources, including data sources for Merchant A and data sources for Merchant B, to receive merchant web site data, merchant data feeds, behavior data on the merchant web site, and/or other data sources for each of the merchants. Data storage layer 130 is also in communication with an application/service 142, an application/service 144, an application/service 146, and an application/service 148. Example applications/services are further described below.

A merchant domain includes a merchant web site 150 and a user browser 160 as also shown in FIG. 1. For example, each of the applications/services can be in communication with merchant web site 150 and user browser 160 as shown. Also, merchant web site 150 is in communication with user browser 160 as also shown.

In some embodiments, the above-described data sources (e.g., data sources for Merchant A shown as 102 and data sources for Merchant B shown as 112) can be processed using various techniques as described below. For example, a web site content fetching process can be performed (e.g., implemented using a web site content fetching engine) to fetch web pages from a merchant web site (e.g., to periodically fetch web pages from merchant web site 104 and merchant web site 114). The content (e.g., HTML content, dynamic content such as Java Script content, and/or other content) from the fetched web pages from the merchant web site can then be parsed to extract attributes for a product, such as a title, a heading, a description, a price, a color(s), and/or a size(s). As another example, a merchant data feed retrieving process can be performed (e.g., implemented using a merchant data feed retrieving engine) to retrieve merchant feeds and parse product attributes, such as title, heading, description, and/or price. As yet another example, a behavior data collection process can be performed (e.g., implemented using a behavioral data collection engine) using pixel data on a merchant's web site. Using this approach, when a user visits a web page of a given merchant's web site, then dynamic content (e.g., Java Script code or other dynamic code/content) on the web page generates a pixel request to the data storage layer that includes, for example, a machine IP (e.g., the IP address associated with the user's device), a user ID (optional), a referrer URL, a web page URL, and/or other information (optional). In this example, raw pixel data can then be provided from each of the merchants (e.g., shown as behavioral data on merchant web site 108 and behavioral data on merchant web site 118). Each of the data sources is described in more detail below in accordance with various embodiments.

As similarly described above, a continuous process can be performed to fetch pages from a merchant website (e.g., implemented using a web site content parsing engine, which can be implemented as a fetching engine (fetcher) shown as 132 and a parsing engine shown as 134). The fetcher (132) (e.g., in some implementations, a web site content parsing engine can include a fetching engine to fetch web pages and a parsing engine to parse the fetched web pages) receives as input a list of URLs on a merchant web site and fetches the content of the web page (e.g., HTML and/or other content on each of the fetched web pages). For example, the HTML content of a fetched web page can then be parsed (e.g., by parsing engine 134) using parsing rules configured for merchant web pages (e.g., manually configured for a particular merchant's web pages or using a default configuration for parsing typical merchant web pages). The parser (134) can parse each page to extract attributes, such as title, heading, description, and price. In some cases, the information on the web page may not be fresh or accurate. For example, the product may go "out of stock," but the web page may display the product to be in-stock. The user may try to purchase the product on the web page but will receive an error saying that the product is "out of stock." Solutions provided by the data storage layer for addressing these and other technical problems that can arise with web related services are further described below with respect to various embodiments.

As similarly described above, a process can be performed to retrieve merchant data feeds for each of the merchants (e.g., implemented using a merchant data feed retrieving engine shown as 136). In an example implementation, the merchant can either provide a location to fetch the merchant data feed or upload the merchant data feed to a location specified for the data storage layer provider. For example, the merchant data feed can be provided as a file (e.g., in a format that can be parsed, such as in an XML or other file format that provides a (subset) view of, for example, a merchant's product/service catalog). In some embodiments, the merchant data feed can be provided on a daily or hourly basis (e.g., or at some other periodic/time interval and/or based on demand). For example, the merchant data feed can be parsed using parsing rules configured for a given merchant or a set of merchants (e.g., based on types/groups of merchants) to extract attributes, such as title, heading, and description. In some cases, the merchant data feed may not be complete, in which, for example, the merchant data feed may only contain a subset of products sold on the merchant web site (e.g., the merchant data may only contain a small subset of the products sold on the merchant web site). Solutions provided by the data storage layer for addressing technical problems that can arise with merging subsets of merchant feed data with other merchant data and other technical problems that can arise with web related services are further described below with respect to various embodiments.

In an example implementation, a process to combine product information from parsed merchant web pages and a retrieved merchant data feed (e.g., such as using various processes as described in detail above) is performed, such as using a product data merging engine shown as 138. It is important to note that for a given product, the information from parsed merchant web pages and a retrieved merchant data feed may be incomplete or inaccurate. For example, "out of stock" information may not be fresh or accurate on merchant web pages. The merchant data feed may contain missing information about products, such as the description for a given product may be missing or incomplete. In some cases, the information from these data sources (e.g., the merchant web site and the merchant data feed) may not match. For example, the price for a given product may be updated in the merchant data feed on an hourly basis, but the web page may display outdated price information. In some implementations, the information from these data sources (e.g., the merchant web site and the merchant data feed) is combined into a single entry for each product using a combination of machine learning algorithms (e.g., association rule learning, support vector machines, Bayesian networks, clustering, decision trees, linear regression, and/or various other machine learning techniques and custom rules can be implemented to facilitate improved merging of such product information from these two different data sources for ensuring data consistency at the data storage layer for the merchant's product/service related data) and custom rules specified for the merchant, such as further described below.

For example, in the case of mismatching price information, a rule may be configured to always prefer the price from the merchant data feed (if available) over the price retrieved from parsing the merchant web pages.

Another data source of information is behavioral user data on a merchant web site. In some cases, a user may visit a merchant web page. For example, Java Script code (e.g., or other executable code/content) on the web page can make a pixel request to the data storage layer (e.g., to a server/service of the data storage layer provider) that includes, for example, a machine IP (e.g., the IP address associated with the user's device), a user ID (optional), a referrer URL, a web page URL, and/or other information (optional). The list of web page URLs can be combined periodically (e.g., each day or at some other periodic interval) and provided as input to the above-described fetching and parsing process to extract information from web pages of a merchant's web site. In an example implementation, for each user, information can be stored to identify products visited and purchased by the user. Similarly, information can be stored to aggregate all user visits and products purchased on a merchant web site. In one embodiment, pixel data can be aggregated across different web sites/merchants as further described herein.

In one embodiment, the above-described processes implemented by the data storage layer are performed per each merchant. For example, each merchant's data is processed independently using the above-described processes for processing each merchant's respective data sources and for performing data merging from distinct data sources (e.g., merging product information from the merchant web site and the merchant data feed) for ensuring data consistency and accuracy of the merchant data stored at the data storage layer.

In some implementations, a product schema is used for storing information in a data store of the data storage layer about products available for sale on a merchant web site. As will be apparent to one of ordinary skill in the art, various forms of product schemas can be used for storing information in a data store about products available for sale on a merchant web site.

An example product schema per merchant is shown below.

```
-- Only supported types are:
--   varchar, boolean, int, bigint, float, double, timestamp, map
-- Product Model:
-- --------------
-- A product is an item that can be purchased or "converted".
--
-- row-key: mpid
--
create table br${merchant_id}_product (
  m_pid      varchar,     -- PartitionKeyType: merchant product id
  -- dependent (NON PRIMARY-KEY) attributes
  -- ----------------------------------------------------------------------
  -- relation to other product groups
  pg_type     varchar,              -- my group type
  pg_o_refs   map<varchar, varchar>,  -- other groups do I refer to? e.g. { 'sku' : ['sku123'] }
  pg_i_refs   map<varchar, varchar>,  -- other groups that refer to me? e.g. { 'suite': 'prod1234' }
  -- life-cycle attributes
  l_first_live_ts  timestamp,      -- when was it first seen as a 'live' product on the site
  l_last_live_ts   timestamp,      -- when was it last seen as a 'live' product on the site
  l_launch_ts      timestamp,      -- merchant supplied
  l_is_live        boolean,        -- whether a product is 'live' or not
  is_blacklist     boolean,        -- whether a product is 'blacklisted' or not
  -- display attributes
  d_title          varchar,     -- display name, the more descriptive the better
  d_description    varchar,        -- paragraph(s) describing its most relevant attributes
  d_brand          varchar,     -- brand name of the manufacturer
  d_model_name     varchar,        -- model_name for this product
  d_gender         varchar,     -- target gender: male, female, unisex
```

```
d_age_group     varchar,              -- target age: baby, kids, junior, adult, senior
d_mature        boolean,              -- mature content (non family-safe)
d_conditions    map<varchar, varchar>,   -- condition (multi-valued): new, used, refurbished
d_colors        map<varchar, varchar>,   -- colors (non-standard names)
d_color_group   map<varchar, varchar>,   -- color group (standard names, no ordering)
d_sizes         map<varchar, varchar>,   -- size (non-standard names)
d_pattern       map<varchar, varchar>,   -- pattern (e.g. polka dot)
d_material      map<varchar, varchar>,   -- material (e.g. nylon)
d_flags         map<varchar, varchar>,   -- static display-flags from merchant, e.g. "more colors"
d_urls          map<varchar, varchar>,   -- product urls
d_th_img_urls   map<varchar, varchar>,   -- thumb image urls (for listing pages)
d_la_img_urls   map<varchar, varchar>,   -- large image urls (for product pages, listing quick view)
d_zo_img_urls   map<varchar, varchar>,   -- zoom image urls (for product page zoom)
d_sw_img_urls   map<varchar, varchar>,   -- swatch image urls (swatches of fabric)
d_keywords      map<varchar, varchar>,   -- for keyword searches
d_stores        map<varchar, varchar>,   -- for store information
-- collection attributes that hold multiple feed fields
d_others        map<varchar, varchar>,   -- use sparingly, custom stuff: e.g. mobile NM merchant_api_json
-- inventory & price attributes
i_price         float,                -- regular price
i_price_rl      float,                -- regular price range (low, high) for group = suite etc.
i_price_rh      float,
i_price_tags    map<varchar, varchar>,
i_sale_price    float,                -- sale price
i_sale_price_rl float,                -- sale price range (low, high) for group = suite etc.
i_sale_price_rh float,
i_sale_price_tags  map<varchar, varchar>,
-- i_sale_dates    map<timestamp, timestamp>,   -- [start_timestamp, end_timestamp]
i_status        varchar,              -- in stock, available for order, out of stock, pre order
i_level         int,                  -- number of units available
i_have_avail    boolean,              -- is the item sellable?
i_last_avail_ts timestamp,            -- when was it last available?
i_buyable       boolean,              -- is the item buyable?
i_have_local_avail map<varchar, varchar>,   -- bnm_store.m_bnid => { latlon: ..., level: InventoryLevelType, ... }
-- category attributes
cat_goog        varchar,              -- google taxonomy, e.g. Apparel & Accessories > Clothing > Jeans
cat_nodes       map<varchar, varchar>,   -- leaf category nodes { category-id : {category-name: ... } }
cat_crumbs      map<varchar, varchar>,   -- merge page data breadcrumbs, e.g. { 'Clearance > Dresses' : 'cat1 > cat2' }
-- blobs
b_paa           blob,                 -- PAAnnotatedPage in compressed byte array form
b_page          blob,                 -- PageData in compressed byte array form
b_variant       blob,                 -- Variant for the product as served by mobile frontend apis
-- canon urls
c_canon_url     varchar,
c_canon_key     varchar,
c_url_flags     varchar,
-- status flags
s_deleted       int,                  -- 0 false, 1 true
s_status_tags   list<varchar>,
-- page_data:
primary key (m_pid)
);
-- Generic Key-Value Store: stores miscellaneous items such as category trees, static assets, etc.
--
create table m${merchant_id}_mob_misc (
  m_rk          varchar,              -- generic row key
  ts            timestamp,            -- timestamp for versioning
  mi_ns         varchar,              -- namespace of data
  mi_nk         varchar,              -- namespace key
  cat_tree      varchar,
  nm_assets     varchar,
  nm_midday     varchar,
  scrape_cat    varchar,
  scrape_search varchar,
  scrape_update boolean,
  others        map<varchar, varchar>,
  primary key (m_rk, ts, mi_ns, mi_nk)
) with clustering order by (ts desc);
```

In some implementations, a non-product schema is used for storing information in a data store about non-product information on a merchant web site (e.g., collected by crawling the merchant web site, such as using the above-described fetching engine). As will be apparent to one of ordinary skill in the art, various forms of non-product schemas can be used for storing information in a data store about non-product information on a merchant web site.

An example schema for storing non-product information per merchant is shown below.

```
-- Web Page View:
-- --------------
-- A web-page is a materialized-view that is accessible via a URL. A
-- web-page may be composed of many entities (e.g., some of which may
```

```
-- correspond to other models in the system, while others being
-- represented as a bag of words or not represented).
--
-- key: mck
--
create table v${merchant_id}_web_page (
  m_ck       varchar,        -- PartitionKeyType: merchant canon-key
  ts         timestamp,      -- versioning timestamp
  src        varchar,        -- ProjectSrc: source of the data
  ptype      varchar,        -- PageType: page-type
  -- Instead of duplicating the various column schemas from the various
  -- models that contributed to this web-page, that data can be viewed as
  -- uninterpreted key-value pairs and delegate to the model logic for
  -- recreating structured data.
  -- m_product stores Product proto, which includes PageData &
  -- PAAnnotation
  -- m_product_quality stores ProductQuality proto
  b_page        blob,           -- PageData in compressed byte array form
  c_canon_url   varchar,
  c_url_flags   varchar,
  s_deleted     int,            -- 0 false, 1 true
  s_status_tags list<varchar>,  -- ArrayList serialized to json
  primary key (m_ck, ts, src, ptype)
) with clustering order by (ts desc);
```

In some implementations, a schema for personalization is used for storing information in a data store about users (e.g., for user personalization). As will be apparent to one of ordinary skill in the art, various forms of schemas for personalization can be used for storing information in a data store about users (e.g., for user personalization).

An example schema for personalization is shown below.

```
//------------------------------------------------------------------------
create table m{{accid}}_shared_items (
  id   varchar,    // item id
  ts   timestamp,  // timestamp - only for versioning,
                   HEAD = '9999-01-01+0000'
  // current owner
  coid varchar,    // owner id
  copp varchar,    // owner passphrase
  cots timestamp,  // ownership timestamp
  // last owner (to avoid race during ownership transfer)
  loid varchar,    // owner id
  lots timestamp,  // ownership timestamp
  lopp varchar,    // owner passphrase
  title varchar,   // visible name of the item
  cts  timestamp,  // creation timestamp
  inv  boolean,    // is the item no longer valid?
                   (unset = valid)
  // attributes
  attrs map<varchar, varchar>,
  //
  // Children of this item (e.g. products belonging to a favorites list).
  // e.g. products are children of favorites:
  // i.e. k: p=prod1234 v: { price: 30, title: studded shoe, brand: prada }
  //
  // NOTE: collections do not support writetime, so if we need to know
  // when updates happened, another column or key inside the collection
  // can be provided.
  parts map<varchar, varchar>,
  primary key (id, ts, coid, copp)
) with clustering order by (ts desc);
//------------------------------------------------------------------------
// objects that refer to a user.
// user <--- item (via action)
// user <--- user (via handle + item)
create table r{{accid}}_user_ref (
  id    varchar,
  refid varchar,
  ts    timestamp,
  hl    varchar,
  attrs map<varchar, varchar>,
  primary key (id, ts, refid)
) with clustering order by (ts desc, refid asc);
// These tables store user profile preferences.
create table m{{accid}}_user_profile_1 (
  id varchar, // user id or cohort id ("feed" is special user)
  p_ns varchar, // primary key namespace (reserved)
  p_nk varchar, // primary key namekey (reserved)
  last_update timestamp,
  user_profile_response blob, // UserProfileResponse protobuf
  as byte array
  num_pref int,
  total_visits int,
  primary key (id, p_ns, p_nk)
);
// This table store user facts
create table m{{accid}}_user_facts (
  id varchar, // user id or cohort id ("feed" is special user)
  p_ns varchar, // primary key namespace (reserved)
  p_nk varchar, // primary key namekey (reserved)
  last_update timestamp, // timestamp of latest user fact
  user_facts blob, // UserProfileResponse protobuf as byte array
  primary key (id, p_ns, p_nk)
);
// Table for storing product recommendations
create table m{{accid}}_product_recommendations (
  id varchar, // product id
  p_ns varchar, // primary key namespace (reserved)
  p_nk varchar, // primary key namekey (reserved)
  last_update timestamp, // timestamp of latest recommendation
  recommendations blob, // ProductRecommendations protobuf
  as byte array
  primary key (id, p_ns, p_nk)
);
```

In one embodiment, the above-described processes implemented by the data storage layer are performed across merchants, such as for merchants that sell overlapping products/services. For example, assuming that Merchant A and Merchant B both sell overlapping apparel or other products, behavioral data for both of these merchants can be processed to facilitate common behavior signals that may be relevant to products/services available from each of these merchants (e.g., overlapping products/services offered from each of the merchants can be automatically identified, such as if two different vendors both offer for sale certain Apple or Google consumer electronic/computing products, then behavior signals related to any of such overlapping products/services can be processed across these merchants to facilitate increased behavior data signals for such overlapping products/services). However, in some cases, merchants may desire to not allow for such cross-merchant data processing at the data storage layer, such as for user privacy or other data protection concerns or contractual restrictions (e.g., a given merchant may have user privacy policies and/or other contractual restrictions that prohibit certain cross-merchant data processing at the data storage layer, in which case any such data for that given merchant can be processed using the above-described per merchant data processing techniques and not the across merchant data processing techniques at the data storage layer).

In some implementations, a combined product schema is used for storing information in a data store about products (e.g., for all or a group of merchants). As will be apparent to one of ordinary skill in the art, various forms of combined product schemas can be used for storing information in a data store about products for all or a group of merchants.

An example combined product schema (e.g., for all or a group of merchants, such as can be used to facilitate the across merchant data processing techniques) is shown below.

```
-- Only supported types are:
--    varchar, boolean, int, bigint, float, double, timestamp, map
-- Product Model:
-- --------------
-- A product is an item that can be purchased or "converted".
--
-- row-key: merchant_id + mpid
--
create table br_product (
    merchant_id         varchar,            -- PartitionKeyType: merchant id
    m_pid               varchar,            -- PartitionKeyType: merchant product id
    -- dependent (NON PRIMARY-KEY) attributes
    -- --------------------------------------------------------------------------------
    -- relation to other product groups
    pg_type             varchar,            -- my group type
    pg_o_refs           map<varchar, varchar>,    -- other groups do I refer to? e.g. { 'sku' : ['sku123'] }
    pg_i_refs           map<varchar, varchar>,    -- other groups that refer to me? e.g. { 'suite': 'prod1234' }
    -- life-cycle attributes
    l_first_live_ts     timestamp,          -- when was it first seen as a 'live' product on the site
    l_last_live_ts      timestamp,          -- when was it last seen as a 'live' product on the site
    l_launch_ts         timestamp,          -- merchant supplied
    l_is_live           boolean,            -- whether a product is 'live' or not
    is_blacklist        boolean,            -- whether a product is 'blacklisted' or not
    -- display attributes
    d_title             varchar,            -- display name, the more descriptive the better
    d_description       varchar,            -- paragraph(s) describing its most relevant attributes
    d_brand             varchar,            -- brand name of the manufacturer
    d_model_name        varchar,            -- model_name for this product
    d_gender            varchar,            -- target gender: male, female, unisex
    d_age_group         varchar,            -- target age: baby, kids, junior, adult, senior
    d_mature            boolean,            -- mature content (non family-safe)
    d_conditions        map<varchar, varchar>,    -- condition (multi-valued): new, used, refurbished
    d_colors            map<varchar, varchar>,    -- colors (non-standard names)
    d_color_group       map<varchar, varchar>,    -- color group (standard names, no ordering)
    d_sizes             map<varchar, varchar>,    -- size (non-standard names)
    d_pattern           map<varchar, varchar>,    -- pattern (e.g. polka dot)
    d_material          map<varchar, varchar>,    -- material (e.g. nylon)
    d_flags             map<varchar, varchar>,    -- static display-flags from merchant, e.g. "more colors"
    d_urls              map<varchar, varchar>,    -- product urls
    d_th_img_urls       map<varchar, varchar>,    -- thumb image urls (for listing pages)
    d_la_img_urls       map<varchar, varchar>,    -- large image urls (for product pages, listing quick view)
    d_zo_img_urls       map<varchar, varchar>,    -- zoom image urls (for product page zoom)
    d_sw_img_urls       map<varchar, varchar>,    -- swatch image urls (swatches of fabric)
    d_keywords          map<varchar, varchar>,    -- for keyword searches
    d_stores            map<varchar, varchar>,    -- for store information
    -- collection attributes that hold multiple feed fields
    d_others            map<varchar, varchar>,    -- use sparingly, custom stuff: e.g. mobile NM merchant_api_json
    -- inventory & price attributes
    i_price             float,              -- regular price
    i_price_rl          float,              -- regular price range (low, high) for group = suite etc.
    i_price_rh          float,
    i_price_tags        map<varchar, varchar>,
    i_sale_price        float,              -- sale price
    i_sale_price_rl     float,              -- sale price range (low, high) for group = suite etc.
    i_sale_price_rh     float,
    i_sale_price_tags   map<varchar, varchar>,
    -- i_sale_dates     map<timestamp, timestamp>, -- [start_timestamp, end_timestamp]
    i_status            varchar,            -- in stock, available for order, out of stock, pre order
    i_level             int,                -- number of units available
    i_have_avail        boolean,            -- is the item sellable?
    i_last_avail_ts     timestamp,          -- when was it last available?
    i_buyable           boolean,            -- is the item buyable?
    i_have_local_avail  map<varchar, varchar>,    -- bnm_store.m_bnid => { latlon: ..., level: InventoryLevelType, ... }
    -- category attributes
    cat_goog            varchar,            -- google taxonomy, e.g. Apparel & Accessories > Clothing > Jeans
    cat_nodes           map<varchar, varchar>,    -- leaf category nodes { category-id : {category-name: ... } }
    cat_crumbs          map<varchar, varchar>,    -- merge page data breadcrumbs, e.g. { 'Clearance > Dresses' : 'cat1 > cat2' }
    -- blobs
    b_paa               blob,               -- PAAnnotatedPage in compressed byte array form
    b_page              blob,               -- PageData in compressed byte array form
    b_variant           blob,               -- Variant for the product as served by mobile frontend apis
    -- canon urls
    c_canon_url         varchar,
    c_canon_key         varchar,
    c_url_flags         varchar,
    -- status flags
    s_deleted           int,                -- 0 false, 1 true
    s_status_tags       list<varchar>,
    -- page_data:
    primary key ((merchant_id, m_pid))
);
```

```
-- Generic Key-Value Store: Stores miscellaneous items such as category trees, static assets, etc.
create table m_mob_misc (
    merchant_id    varchar,              -- merchant id
    m_rk           varchar,              -- generic row key
    ts             timestamp,            -- timestamp for versioning
    mi_ns          varchar,              -- namespace of data
    mi_nk          varchar,              -- namespace key
    cat_tree       varchar,
    nm_assets      varchar,
    nm_midday      varchar,
    scrape_cat     varchar,
    scrape_search  varchar,
    scrape_update  boolean,
    others         map<varchar, varchar>,
    primary key ((merchant_id, m_rk), ts, mi_ns, mi_nk)
) with clustering order by (ts desc);
```

An example schema for storing non-product information (e.g., for all or a group of merchants) is shown below.

```
-- Web Page View:
-- --------------
-- A web-page is a materialized-view that is accessible via url. A web-page may be composed of
-- many entities (some of which may correspond to other models in the system, while others being represented as
-- a bag of words or not represented).
--
-- key: mck
--
create table v_web_page (
    merchant_id   varchar,
    m_ck          varchar,              -- PartitionKeyType: merchant canon-key
    ts            timestamp,            -- versioning timestamp
    src           varchar,              -- ProjectSrc: source of the data
    ptype         varchar,              -- PageType: page-type
    -- Instead of duplicating the various column schemas from the various models that contributed to this web-page,
    -- we simply treat that data as uninterpreted key-value pairs and delegate to the model logic for recreating
    -- structured data.
    -- m_product stores Product proto, which includes PageData & PAAnnotation
    -- m_product_quality stores ProductQuality proto
    b_page        blob,                 -- PageData in compressed byte array form
    c_canon_url   varchar,
    c_url_flags   varchar,
    s_deleted     int,                  -- 0 false, 1 true
    s_status_tags list<varchar>,        -- ArrayList serialized to json
    primary key (m_ck, ts, src, ptype)
) with clustering order by (ts desc);
```

An example schema for personalization (e.g., for all or a group of merchants) is shown below.

```
//------------------------------------------------------------------------
create table shared_items (
  merchant_id varchar,
  id        varchar,           // item id
  ts        timestamp,         // timestamp - only for versioning,
                               HEAD = '9999-01-01+0000'
  // current owner
  coid      varchar,           // owner id
  copp      varchar,           // owner passphrase
  cots      timestamp,         // ownership timestamp
  // last owner (to avoid race during ownership transfer)
  loid      varchar,           // owner id
  lots      timestamp,         // ownership timestamp
  lopp      varchar,           // owner passphrase
  title     varchar,           // visible name of the item
  cts       timestamp,         // creation timestamp
  inv       boolean,           // is the item no longer valid?
                               (unset = valid)
  // attributes
  attrs   map<varchar, varchar>,
  //
  // Children of this item (e.g. products belonging to a favorites list).
  // e.g. products are children of favorites:
  // i.e. k: p=prod1234 v: { price: 30, title: studded shoe, brand: prada }
  //
  // NOTE: collections do not support writetime, so if we need to know
  // when updates happened, we would need another column or
  // key inside the collection.
  parts   map<varchar, varchar>,
  primary key ((merchant_id, id), ts, coid, copp)
) with clustering order by (ts desc);
//------------------------------------------------------------------------
// objects that refer to a user.
//   user <--- item (via action)
//   user <--- user (via handle + item)
create table user_ref (
  merchant_id varchar,
  id      varchar,
  refid   varchar,
  ts      timestamp,
  hl      varchar,
  attrs   map<varchar, varchar>,
  primary key ((merchant_id, id), ts, refid)
) with clustering order by (ts desc, refid asc);
// These tables store user profile preferences.
```

-continued

```
create table user_profile_1 (
merchant_id varchar,
 id varchar, // user id or cohort id ("feed" is special user)
 p_ns varchar, // primary key namespace (reserved)
 p_nk varchar, // primary key namekey (reserved)
 last_update timestamp,
 user_profile_response blob, // UserProfileResponse protobuf as
 byte array
 num_pref int,
 total_visits int,
 primary key ((merchant_id, id), p_ns, p_nk)
);
// This table stores user facts
create table user_facts (
 merchant_id varchar,
 id varchar, // user id or cohort id ("feed" is special user)
 p_ns varchar, // primary key namespace (reserved)
 p_nk varchar, // primary key namekey (reserved)
 last_update timestamp, // timestamp of latest user fact
 user_facts blob, // UserProfileResponse protobuf as byte array
 primary key ((merchant_id, id), p_ns, p_nk)
);
// Table for storing product recommendations
create table product_recommendations (
 merchant_id varchar,
 id varchar, // product id
 p_ns varchar, // primary key namespace (reserved)
 p_nk varchar, // primary key namekey (reserved)
 last_update timestamp, // timestamp of latest recommendation
 recommendations blob, // ProductRecommendations protobuf as
 byte array
 primary key ((merchant_id, id), p_ns, p_nk)
);
```

An example architecture and processes for ingesting data from merchant data sources by the data storage layer will now be described with respect to FIG. 2.

Figure 2:
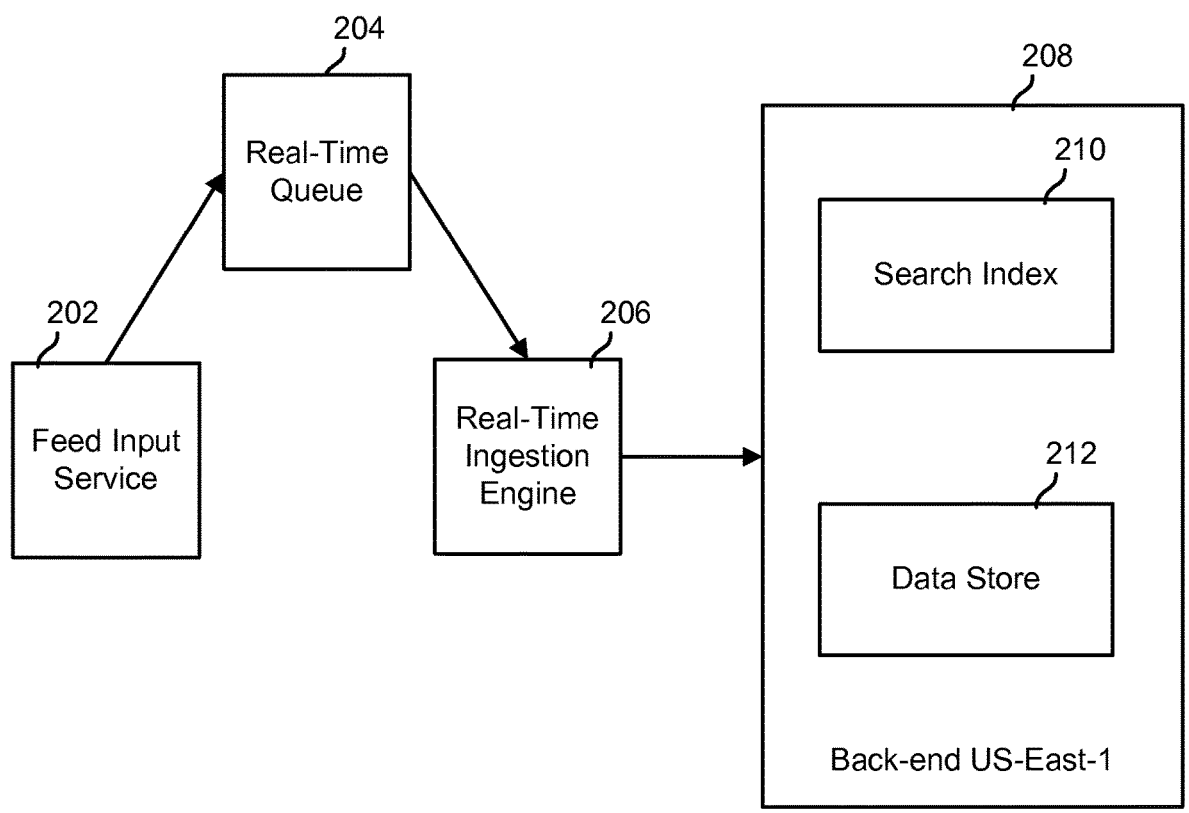
FIG. 2 is a functional block diagram illustrating an architecture for ingesting data from merchant data sources at the data storage layer in accordance with some embodiments.

FIG. 2 is a functional block diagram illustrating an architecture for ingesting data from merchant data sources at the data storage layer in accordance with some embodiments. In one embodiment, the above-described merchant data sources, including merchant data feeds, from the data sources domain are ingested in real-time at the data storage layer (e.g., distributed data storage layer, such as further described herein). In one embodiment, merchant data feed retrieving engine 136 is implemented as shown in FIG. 2 and as further described below.

As shown, a merchant can call a feed input service 202 to provide a new/updated merchant data feed in real-time via a real-time ingestion engine 206 to the data storage layer, which includes a back-end US-East-1 cluster 208 including a search index 210 (e.g., for searching and indexing of merchant data to provide a search index of the merchant data, which can be implemented using a commercially available, open source platform such as SolrCloud, as further described herein) and a data store 212 (e.g., for storing the merchant data and for supporting primary key-based searching of the merchant data, which can be implemented using a commercially available, open source platform such as Cassandra, as further described herein). In some cases, this data can be a subset of the overall set of product attributes of the merchant's product data (e.g., an incremental merchant data feed) that are time sensitive (e.g., quantity, in/out of stock, price, and/or other time sensitive related product attributes). For example, pricing and inventory can be time sensitive information that can be updated using the feed input service to facilitate real-time ingestion of such time sensitive product attributes at the data storage layer.

As also shown, feed input service 202 and real-time ingestion engine 206 are in communication through a real-time queue 204 to facilitate an internal queue update of the product information in the merchant data feed in real-time to the data storage layer. As used herein, real-time generally refers to providing the merchant data feed to the data storage layer within seconds (e.g., within a few seconds) for small workloads (e.g., a data feed that includes approximately 5,000 to 10,000 items, in which each item is approximately 10 KB in size), and for certain spikes in merchant data feed updates, real-time generally refers to providing the merchant data feed to the data storage layer within minutes (e.g., within a few minutes, or possibly more than a few minutes for very large and sudden spikes in merchant data feed updates) for large workloads (e.g., a data feed that includes approximately 100 million items, in which each item is approximately 10 KB in size). In some cases, such as is often the case in the context of products and associated attributes, minutes is usually within tolerable limits for most merchants.

Figure 3:
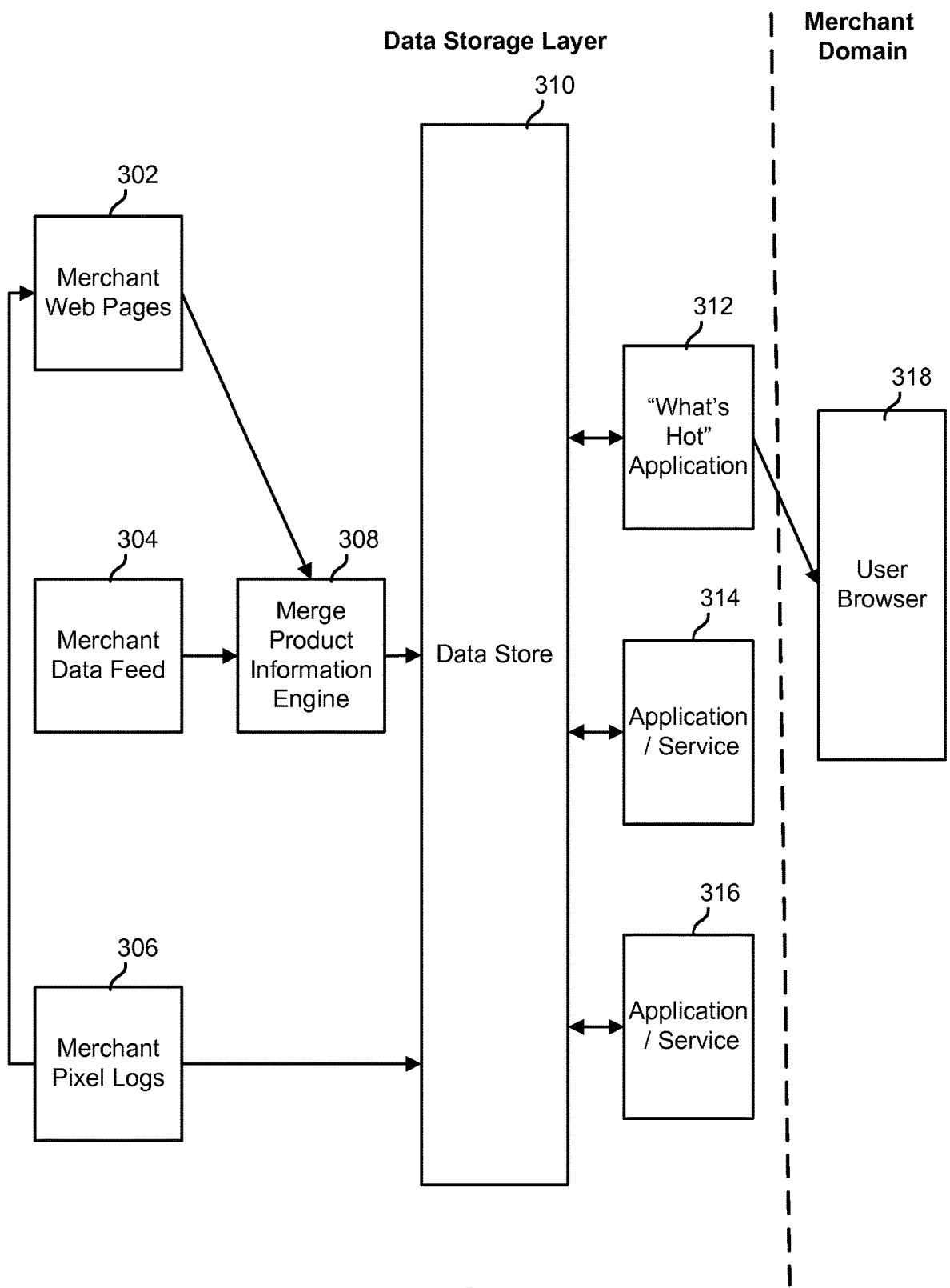
FIG. 3 is a functional block diagram illustrating a distributed and fast data storage layer for large scale web data services including an example application that utilizes the data storage layer in accordance with some embodiments.

FIG. 3 is a functional block diagram illustrating a distributed and fast data storage layer for large scale web data services including an example application that utilizes the data storage layer in accordance with some embodiments. As shown, merchant data sources include merchant web pages 302, merchant data feed 304, and merchant pixel logs 306 (e.g., providing behavioral data on a merchant's web site, such as similarly described above with respect to FIG. 1). Merchant pixel logs 306 are provided via merchant web pages 302 as input along with merchant data feed 304 to a merge product information engine 308. In one embodiment, merge product information engine 308 merges various merchant data sources, including merchant web pages 302, merchant data feed 304, and merchant pixel logs 306 as shown in this example, to provide an accurate and consistent view of a merchant's web site related data and product catalog. The merged product information is provided from the merge product information engine 308 to data store 310 (e.g., a data store of the distributed data storage layer, such as similarly described herein with respect to FIG. 1).

As also similarly described above with respect to FIG. 1, the data storage layer can provide various applications/services using the merged product information of a given merchant maintained in a data store. As shown, data store 310 is in communication with a "What's Hot" application 312 and other applications/services 314 and 316, which can then communicate with a given user's browser, shown as user browser 318 in the merchant domain.

For example, "What's Hot" application 312 is an example application/service that can determine which products are popular (e.g., such as products that are currently popular that are available for sale on a merchant's web site) based on real-time merged product information for a merchant's web site related data. "What's Hot" application 312 can then display any such popular products on the merchant website (e.g., such popular products can be dynamically displayed using a widget on the merchant's web site or other techniques can be used for automatically displaying such popular products on the merchant's web site that can then be viewed by a user via their user browser). In an example implementation, the "What's Hot" application can display products that receive the highest number of user visits in a given time period (e.g., within the last one hour, one day, one week, or some other time period). In this example, for each product, the "What's Hot" application can display fresh and accurate information including price, out-of-stock, and/or other product related information based on real-time merged product information for a merchant's web site related data maintained at data store 310. In some cases, the products may go on sale and their price may be reduced or they may be sold out. For example, for each product, the "What's Hot" application can query data store 310 using a product ID as the primary key. In response, data store 310 can return the most up-to-date and accurate information about the product including, for example, title, description, price, and out-of-stock information associated with the product ID that is stored in the data store. This current product information can then be displayed to the user via the user's browser.

In one embodiment, the data storage layer provider can provide or support many different applications/services that utilize real-time merged product information for a merchant's web site related data maintained in the data store. For example, the applications/services can utilize real-time merged product information for a merchant's web site related data maintained in the data store of the data storage layer by searching such product information based on different search queries (e.g., search strings, product IDs, and/or other search queries) to obtain additional, updated, and/or more detailed information for one or more products provided by a given merchant, such as similarly described above with respect to the "What's Hot" application/service. Depending on the application, the search and merchant data extraction can be performed in a front-end environment under very low latency conditions or in a back-end environment under very high throughput conditions, such as further described below with respect to various embodiments.

An organic search related application is another example application/service that can be facilitated by a data storage layer using the various techniques described herein. For example, assume that a given merchant has an organic search box on the merchant's web site that allows a user to submit search string queries to attempt to find products/services of interest to the user on the merchant's web site. By leveraging a deep understanding of the content on a merchant's web site and web's content, an organic search application can be implemented to automatically match a given user's intent (e.g., consumer intent) to the merchant's content to identify relevant products/services on the merchant's web site, which can facilitate increased merchant revenue by improving organic search ranking of relevant products/services for a given user.

A related searches application is another example application/service that can be facilitated by a data storage layer using the various techniques described herein. For example, a related searches application can utilize real-time merged product information for a merchant's web site related data maintained in the data store of the data storage layer to automatically determine and display relevant links to a page to flatten a web site structure and enhance content richness of a merchant's web site.

A related products application is another example application/service that can be facilitated by a data storage layer using the various techniques described herein. For example, a related products application can utilize real-time merged product information for a merchant's web site related data maintained in the data store of the data storage layer to automatically identify and add content to a web page of a merchant's web site to make that web page more discoverable and easy for search-engine bots to crawl and index (e.g., to improve search engine results when users perform organic searches using web search engines, such as search engines available from Google, Microsoft Bing, Yahoo, and/or other search engine service providers). As a result, the related products application can make it easier for users to discover such web pages on a merchant's web site using organic search and discover related products via browsing the merchant's web site.

A thematic pages application is another example application/service that can be facilitated by a data storage layer using the various techniques described herein. For example, a thematic pages application can utilize real-time merged product information for a merchant's web site related data maintained in the data store of the data storage layer to automatically create, edit or retire recommended pages that match products with intent (e.g., a user's intent, based on, for example, a user's behavior/browsing activity on the merchant's web site and/or other merchants' web sites).

A Search, Navigation, and Personalization (SNAP) application is another example application/service that can be facilitated by a data storage layer using the various techniques described herein. For example, a SNAP application can utilize real-time merged product information for a merchant's web site related data maintained in the data store of the data storage layer to automatically personalize site search, content, and navigation to make each visit personal for every user across all devices (e.g., across all of a user's devices, such as a given user's smart phone, tablet, and laptop). SNAP can integrate consumers' behaviors, a given merchant's web site content, and broader web-wide data available on demand when a shopper uses natural language search queries to search the merchant's web site. In an example implementation, SNAP generates for each and every consumer a uniquely personal experience tailored to their preferences while matching current intent.

A compass application is another example application/service that can be facilitated by a data storage layer using the various techniques described herein. For example, a compass application can utilize real-time merged product information for a merchant's web site related data maintained in the data store of the data storage layer to automatically understand a merchant's products and identifies opportunities to maximize revenue. In some cases, such content understanding enables action on the relationships between the attributes and types of products sold by the merchant via the merchant's web site.

In one embodiment, the data storage layer can be implemented using cloud/remote computing services, such as provided by various cloud computing service providers (e.g., Amazon, HP, IBM, and other companies offer such commercially available cloud computing services). For example, the data storage layer can be implemented using Amazon Web Services (AWS) for data storage and computing purposes performed by the data storage layer as described herein. Various AWS instance types that can be used to implement the data storage layer are further described below.

For example, Amazon Elastic Compute Cloud® (EC2) is a commercially available cloud computing service from Amazon that can be used to implement the data storage layer for compute purposes. Amazon EC2 is hosted in multiple locations worldwide. These locations are generally composed of regions and availability zones. Each region is typically a separate geographic area. Each region typically has multiple, isolated locations known as availability zones.

In an example implementation, the data storage layer described herein includes a dedicated Cassandra cluster(s). For example, dedicated Cassandra clusters can be implemented using the following example hardware environment: 60×i2.xlarge (e.g., across three availability zones in US-East-1 region), 12×i2.xlarge (e.g., across three availability zones in US-West-1 region), and 6×i2.xlarge (e.g., across three availability zones in EU-West-1 region).

In an example implementation, the data storage layer described herein also includes a dedicated SolrCloud cluster(s). For example, dedicated SolrCloud clusters can be implemented using the following example hardware environment: 12×r3.2xlarge (e.g., across three availability zones in US-East-1 region), 6×r3.2xlarge (e.g., across three availability zones in US-West-1 region), and 6×r3.2xlarge (e.g., across three availability zones in EU-West-1 region).

In an example implementation, the data storage layer described herein can also include on-demand clusters. On demand clusters can be distributed across one or more availability zones and can also be continuously optimized for cost efficiency. For example, Amazon EC2 Spot Instances can be used for the on-demand cluster(s). A resource manager, such as further described below), can continuously optimize a cluster size for cost and usage efficiencies. An example hardware configuration for the on-demand clusters at a particular time is as follows: 14×m1.medium, 7×m1.large, 11×r3.large, 4×r3.xlarge (e.g., across four availability zones in US-East-1 region), 9×hi1.4xlarge, 1×c3.8xlarge, and 2×c3.large (e.g., across four availability zones in US-West-1 region).

As will now be apparent to one of ordinary skill in the art, various other hardware environments and/or cloud service providers can be used to efficiently and effectively implement the data storage layer to perform the various techniques disclosed herein. As another example, a data storage layer provider can implement the data storage layer using hardware in its own data center(s) and/or using a combination of hardware in its own data center(s) and one or more cloud service providers.

In one embodiment, the data storage is a high-availability storage layer, horizontally scalable, supports primary key look-up of product/service merchant product information, supports search by various attributes of a document (e.g., a web page), and provides a reliable and fast data storage layer infrastructure. Each of these aspects of the distributed data storage layer is further described below.

In an example implementation, the data storage is a high-availability storage layer that is fault-tolerant and can provide high up-time to customers (e.g., 99 percent up-time or some other metric that corresponds to a high up-time to customers). For example, the distributed cluster architecture of the data storage layer is resilient in the presence of failures of individual nodes in the system.

In an example implementation, the data storage is also horizontally scalable (e.g., scale-out, infinitely scalable). For example, the data storage layer can scale the infrastructure by adding more nodes to the system. Generally, there should not be an upper limit to the amount by which the system can be scaled using the techniques disclosed herein.

In an example implementation, the data storage layer can also support look-up by primary key for an application/service supported/provided by the data storage layer provider. For example, as similarly described above, various applications/services can utilize the merchant product information stored at the data storage layer to perform primary key look-ups into the merchant product information to facilitate various applications/services.

In an example implementation, the data storage can also support scans of the entire data store for an application/service supported/provided by the data storage layer provide. For example, as similarly described above, various applications/services can utilize the merchant product information stored at the data storage layer to perform scans of all merchant products to facilitate various applications/services.

In an example implementation, the data storage can also support search by various attributes for an application/service supported/provided by the data storage layer provider. For example, various applications/services can utilize the merchant product information stored at the data storage layer to perform searches by various attributes of a document that is a canonical/internal representation of a web page of a merchant's web site to facilitate various applications/services.

In an example implementation, the data storage layer can also provide predictable and fast performance for all read/write/scan/search requests. For example, 99 percent of read, write, scan, and/or search requests can be successfully completed within a given time threshold in an example implementation.

In one embodiment, the data storage layer includes a highly available, fault tolerant, and horizontally scalable key-value storage solution. Example storage solutions that can be used for implementing such a data storage layer include the following commercially available, open source storage solutions: Apache Cassandra, Apache HBase, BerkeleyDB, and LevelDB. As will now be apparent to one of ordinary skill in the art, various other commercially available and/or open source storage solutions can similarly be used to implement the data storage layer.

Various properties of the data store layer can include the following requirements for the data storage layer to implement the various techniques described herein, as further described below.

Each data item (e.g., data items from merchant data sources) is replicated multiple times and stored on different physical and/or virtual nodes so that merchant data can still be retrieved if one or more of these nodes are unavailable. For example, this replication approach facilitates fault tolerance for the data storage layer.

A failure of one or a few nodes does not affect the availability of the system, which is implemented as a distributed system. Also, transient problems like network connections would not affect the availability of the system (e.g., due to the replication and geographical distribution architecture of the data storage layer implementation disclosed herein).

Data can be replicated across physically isolated data centers. In this case, data is still available for read/write as long as at least one copy of the data is available.

A cluster can be scaled to store X times the current data size by, for example, simply adding X times more nodes to the cluster. For example, the data storage layer is horizontally scalable as similarly discussed above.

In some cases, applications/services may be sensitive to the "latency" of read/write requests. The "latency" of the request as seen by the client (e.g., user browser) can be defined as the time interval between which the request is made by the client and a response is received by the client. For example, some applications may require certain latency requirements for read and write requests. In some cases, TP (top percentile) 95/99-->t guarantees can be provided within a time t, as a service level agreement (SLA).

In some cases, applications may perform bulk operations on the data store of the data storage layer. In some cases, a bulk operation performs a read/write for many rows in the data store (e.g., for different primary keys) in the same operation. For bulk operations, it is desired that the data storage layer provide high throughput measured as the maximum number of simultaneous read/write operations that can be supported.

In one embodiment, the data storage layer also includes a reverse search index that can support efficient look-ups by secondary attributes (e.g., a reverse look-up index). A secondary attribute as used herein generally refers to any attribute of a web page that is not a part of the primary key as defined by the application. This may be generally referred to as search. The process of adding documents to the search index (e.g., or simply referred to as the index) is generally referred to as indexing. As an example implementation, various commercially available, open source platforms that can be used to provide such search functionality include Apache Lucene and Apache Solr. However, a limitation of these platforms is that they do not support horizontal scalability as described above, because these platforms cannot be scaled simply by adding more nodes to the system. Apache SolrCloud is an example of a system that can be scaled horizontally by sharding the data. A shard as used herein generally refers to any subset of the original dataset. Data can generally be partitioned into multiple shards such that they are mutually exclusive but together they comprise the entire data set. For example, using this approach, a reverse look-up index can be provided by the data storage layer to support various search use cases, such as a user query for "Samsung" to retrieve a particular Samsung product, even if the primary key (e.g., product ID) is not known from the query.

Another property of the data storage layer disclosed herein is data consistency. There are several models for data consistency including strong consistency and eventual consistency, which are each described below. In some cases, strong consistency can be defined as the property of a system that ensures all accesses are seen by all parallel processes (e.g., or nodes, processors, etc.) in the same order (sequentially). In some cases, eventual consistency informally guarantees that, if no new updates are made to a given data item, eventually all accesses to that item will return the last updated value.

In one embodiment, a system for the data storage layer is disclosed that provides eventual consistency for all data maintained (e.g., stored) at the data storage layer. Also, if a data item is updated in the data store of the data storage layer, that data item can be updated in the reverse search index on a best-effort basis. Thus, in this case, there is no strong consistency requirement for such data updates in this example implementation of a system for the data storage layer, but eventual consistency is provided by this example implementation of a system for the data storage layer.

In one embodiment, a centralized data store also facilitates data sharing, in which data computed by one application can be stored in the data store at the data storage layer and can generally be used at no additional cost by one or more other applications/services provided or supported by the data storage layer provider. A centralized data store also facilitates centralized operations, in which one or more other applications can use the same cluster of nodes that prevents each application from maintaining its own cluster and, therefore, can reduce overall maintenance overhead.

Figure 4:
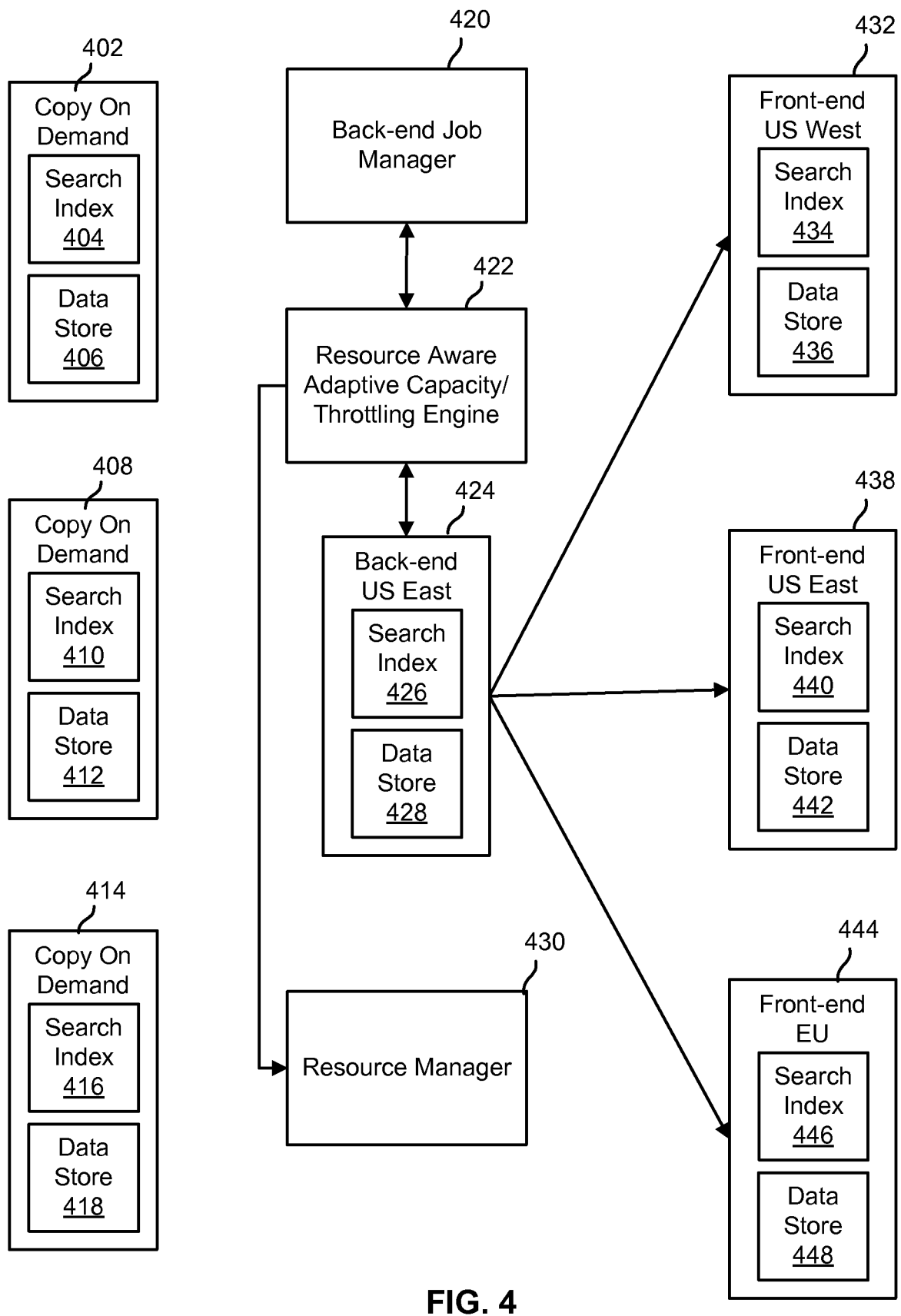
FIG. 4 is a functional block diagram illustrating a topology of a distributed system for implementing the data storage layer in accordance with some embodiments.

FIG. 4 is a functional block diagram illustrating a topology of a distributed system for implementing the data storage layer in accordance with some embodiments. In one embodiment, the data storage layer provides fast and guaranteed performance in terms of response time, such as similarly described above, using various techniques described herein. For example, a topology of a distributed system for implementing the data storage layer as shown in FIG. 4 can provide consistent and fast performance for all applications across geographical locations, such as US East, US West, EU West, and/or other geographies, as further described below.

As similarly discussed above, the input for processing by the back-end is the merchant data feed. In one embodiment, the topology for the data storage layer includes a back-end cluster and a front-end cluster shown, which each include a search index (e.g., implemented using Apache SolrCloud or another indexing framework/platform, facilitating look-up by attribute/reverse index lookup, such as similarly described above) and a data store (e.g., implemented using Cassandra or another data store, facilitating primary key look-up, such as similarly described above). As shown, the data storage layer includes a back-end cluster that includes a back-end US East 424 that includes a search index 426 and a data store 428. As also shown, the back-end cluster is in communication with the front-end cluster that includes the following: a front-end US West 432 that includes a search index 434 and a data store 436, a front-end US East 438 that includes a search index 440 and a data store 442, and a front-end EU 444 that includes a search index 446 and a data store 448.

It is important to note the distinction between the front-end cluster and the back-end cluster. In this example implementation, the merchant data is replicated between the back-end cluster and the front-end cluster.

For example, the back-end cluster can be primarily used by applications performing batch operations that aim to maximize the throughput for the cluster. MapReduce (e.g., such as using Hadoop to efficiently distribute jobs in a distributed environment, such as can be implemented by the AWS Elastic MapReduce service) is an example of such an application. As shown, back-end job manager 420 is in communication with back-end US East 424 via a resource aware adaptive capacity/throttling engine 422 for distributing jobs to the back-end cluster or copy on demand dynamic clusters, such as further described below. In one embodiment, the back-end job manager uses the resource aware adaptive capacity/throttling engine for distributing jobs and creating/terminating additional back-end copy-on-demand clusters (e.g., as needed/based on demand and/or other configured requirements).

For example, the front-end cluster can primarily be used by applications that are sensitive to latency and are configured to ensure that a given percentile of requests (e.g., 99 percentile or some other performance threshold SLA commitment or target) are services within a given time threshold. The front-end cluster may be available in different geographical locations as shown in FIG. 4, such as US East and US West (e.g., geolocation distribution to facilitate fast response regardless of network latency). The front-end cluster for a merchant is typically located in a geographical location physically close to a merchant data center to optimize network latencies between the merchant data center and the data storage layer data center.

In one embodiment, data replication from the back-end cluster to the front-end cluster is eventually consistent, such as similarly described above. For example, if no new updates are made to the data item, then all access to data items in the front-end cluster will return the last updated value. In some implementations, the web pages stored in the data store are also stored in the search index to allow for search by secondary attributes, such as similarly described above.

In an example implementation, the back-end job manager (e.g., an elastic Hadoop service) can be elastic and scale to large volumes of data. However, the Cassandra database and SolrCloud search index are generally not capable of scaling that quickly to large volumes of data. As such, this can result in scaling problems that denigrate compute performance of the system for the distributed data storage layer. For example, if there is a terabyte of merchant data that is stored on three clusters on three different machines/nodes, and three new machines/nodes are to be added, such as shown in FIG. 4, then the time cost to redistribute/replicate that terabyte of merchant data across the three new machines/nodes can require a significant amount of time, such as 24 hours or longer.

Accordingly, a dynamic clustering solution using a copy on demand search index and data store is disclosed to solve these technical problems in accordance with some embodiments. Referring to FIG. 4, a dynamic cluster includes a copy on demand 402 that includes a search index 404 and data store 406, a copy on demand 408 that includes a search index 410 and data store 412, and a copy on demand 414 that includes a search index 416 and data store 418 as shown. For example, the copy on demand search index and data store can be provided by capturing a snapshot of the data and the search index in a dynamic cluster. As a result, such a copy on demand cluster(s) can scale linearly at the same pace as, for example, an AWS EMR job can scale.

In one embodiment, resource aware adaptive capacity/throttling engine 422 can determine whether to perform a back-end job using a copy on demand cluster for processing a particular job for a given merchant. For example, if a large data feed processing job for a Merchant A is received from the back-end job manager, then resource aware adaptive capacity/throttling engine 422 can delegate the job to be performed using a copy on demand dynamic cluster for Merchant A to efficiently perform the job for Merchant A without disrupting job processing for other merchants that have merchant data stored and processed using the back-end cluster, such as further described below.

In one embodiment, data processing is performed using a new copy on demand cluster layer in the topology of the data storage layer that facilitates copy on demand to provide for state-based data processing, and then the back-end cluster of the data storage layer is only responsible for storing the data, not processing the data (e.g., processing and merging of updated merchant data can be handled by the copy on demand dynamic cluster layer, such as described herein). In one embodiment, copy on demand is implemented using a copy on demand cluster layer, such as shown in FIG. 4, to perform per merchant data feed processing. For example, this allows for a processing demand of updating one merchant's data feed to not impact another merchant's data feed processing to facilitate performance isolation between merchants (e.g., processing data feed of a large merchant does not impact other merchants). Also, using this copy on demand cluster technique can more quickly replicate (state) data of a database for a given merchant to perform that processing of the merchant's data feed and verifying/maintaining data consistency (e.g., to update and reconcile updated merchant data received in a new merchant data feed with existing merchant product information), such as similarly described above. In an example implementation, this copy on demand cluster technique provides for a copy/snapshot of the SolrCloud cluster and/or a copy/snapshot of the Cassandra cluster to facilitate copy on demand data processing as described herein.

In one embodiment, fixed pricing for cloud-processing services pricing is used to implement job processing for the back-end using the copy-on-demand techniques described above.

In one embodiment, demand-based pricing for cloud-processing services pricing is used to implement job processing for the back-end using the copy-on-demand techniques described above. In one embodiment, to reduce cost and ensure high availability of machines (e.g., physical and/or virtual servers) for scaling at a rapid rate, a resource manager 430 is provided to reduce or optimize costs associated with such demand-based pricing for cloud-processing services pricing used to implement job processing for the back-end using the copy-on-demand techniques described above. For example, resource manager 430 can select machines (e.g., physical/virtual compute resources of a cloud computing service) based on a back-end job manager requirement (e.g., based on an AWS EMR job requirement) and the market price of the instances on a market place for a cloud computing service provider (e.g., the Amazon Spot Instance market place for AWS or another cloud computing service provider, in which there is demand-based pricing for cloud-processing services).

In one embodiment, resource manager 430 uses a resource aware adaptive capacity/throttling engine 422 to meet resource requirements for performing back-end job processing using the back-end cluster and/or copy on demand dynamic cluster. In an example implementation, resource aware adaptive capacity/throttling engine 422 implements the following rules: (1) fixed capacity (e.g., defined limits); (2) enforced limits; (3) quotas per application (e.g., to meet service level commitment (SLA) per merchant, such as within 1-hour to update merchant pricing)); and/or (4) dynamic rate limiting.

The following algorithm is an example of how resource manager 430 can optimize for the least expensive computation resource for performing a given job(s). Similarly, the below shown algorithm can be adjusted for optimizing for disk resource or memory resource utilization as will now be apparent to one of ordinary skill in the art.

```
maxCpuPerUnitPrice = 0
optimalInstanceType = null
For each instance_type in (Availability Zone, Region) {
    cpuPerUnitPrice = instance.cpuCores/instance.spotPrice
    if (maxCpuPerUnitPrice < cpuPerUnitPrice) {
        optimalInstanceType = instance_type;
    }
}
```

For example, given the potential fluctuations in the spot price of an instance on the market place, for ensuring availability and the stability of the on-demand cluster, the spot price can be computed as a moving average over the time axis to avoid selecting instances that have very high peak demand and variations in prices. As such, the resource manager can reduce or optimize a cost for providing job processing for the back-end using the copy-on-demand techniques described above.

Another technical problem that can arise is that the front-end data centers can have a requirement to provide very low latencies for data access and search. The main contention on the front-end data centers typically arises from the actual throughput from front-end applications and data copy for new data generated by the back-end jobs. To reduce the contention of the data generated by back-end jobs, a column-level replication strategy is performed, in which data is replicated from the back-end to the front-end on an individual column level (e.g., for each attribute of a product in the merchant data, (custom) rules can be applied to select which data is to be replicated to the front-end and what data should only be maintained/stored at the back-end). For example, a front-end application may not require the description of a product for display, however, the back-end application may need to generate a search index that is based on the description of the product. In this case, using a column-level replication strategy, a workload on the front-end is significantly reduced by not replicating such product description data to the front-end. This column-level replication strategy also allows for dynamic run-time decisions that can be merchant-based without requiring any development effort to change the view on the front-end.

Accordingly, a column-level replication is performed to reconcile merchant data that is stored at the back-end cluster with a subset of merchant data that is copied to and stored at the front-end cluster of the distributed data storage layer that facilitates dynamic data modeling (e.g., at run-time/real-time) in accordance with some embodiments. For example, intelligently subsetting the merchant data (e.g., dynamic data modeling) at real-time, such as by only replicating the title and an image of a given merchant's product data (e.g., not product description, SKUs, etc.) to the front-end clusters (e.g., only replicating a subset of columns from the database based on rules, which can be default or custom rules for a given merchant), reduces the amount of data for replication between the back-end and front-end clusters per merchant. This approach also facilitates capacity and performance of the data storage layer in communication with the front-end layer (e.g., application layer).

An example filter for efficiently controlling data flow between the back-end and front-end clusters is shown below, which provides an example schema for filtering product attribute data to subset product information in order to reduce replication as similarly described above for implementing this column-level replication strategy.

front-end can be reduced is by implementing a prioritization mechanism whereby a request originating from a front-end application is given higher precedence compared to a back-end (application) request.

Figure 5:
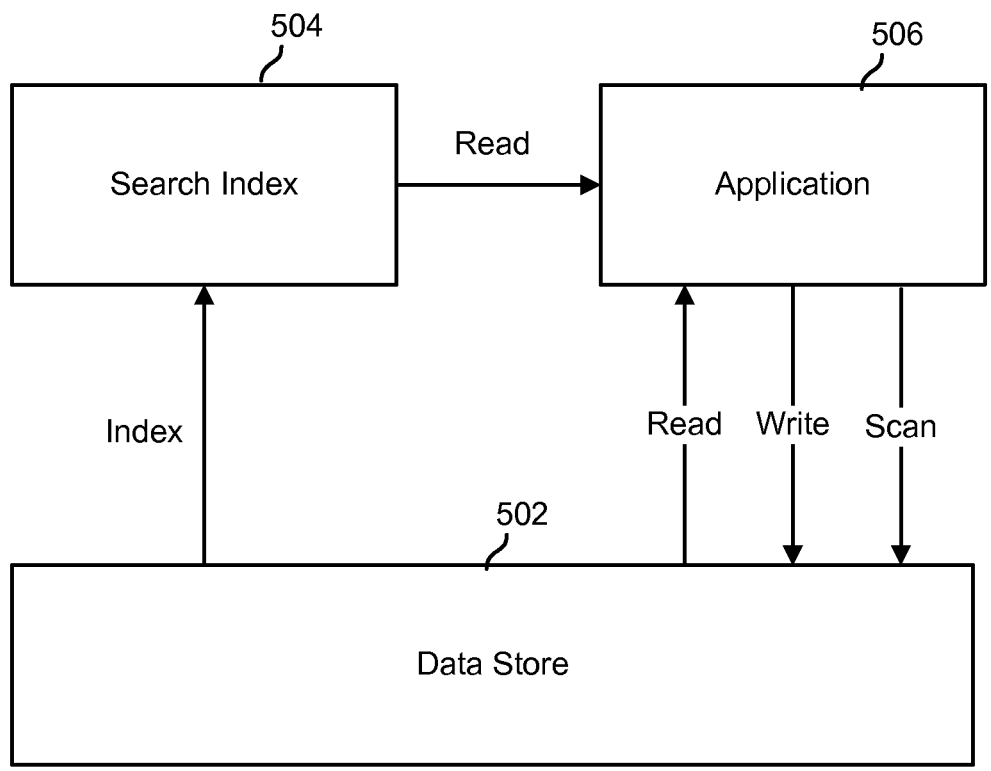
FIG. 5 is a functional block diagram illustrating a data storage layer in communication with an application in accordance with some embodiments.

FIG. 5 is a functional block diagram illustrating a data storage layer in communication with an application in accordance with some embodiments. As shown, a data store 502 (e.g., implemented using Cassandra, such as similarly described above) is in communication with a search index 504 (e.g., implemented using SolrCloud, such as similarly described above). As also shown, an application 506 is in read/write/scan communication with data store 502, and search index 504 is in read access communication with application 506 (e.g., an application/service provided by the data storage layer provider, such as a web-related application/service as similarly described above).

In some cases, applications can store information from various external sources. For example, an application can store web page information from web-wide web data (e.g., web pages from web sites, such as from merchant web sites, and/or other web sites). As another example, an application can store merchant data feed information about products and other web pages provided by a given merchant.

For example, applications can then compute derived information based on the above information and store the derived information in the data store by writing the data to the data store as shown in FIG. 5.

Figure 6:
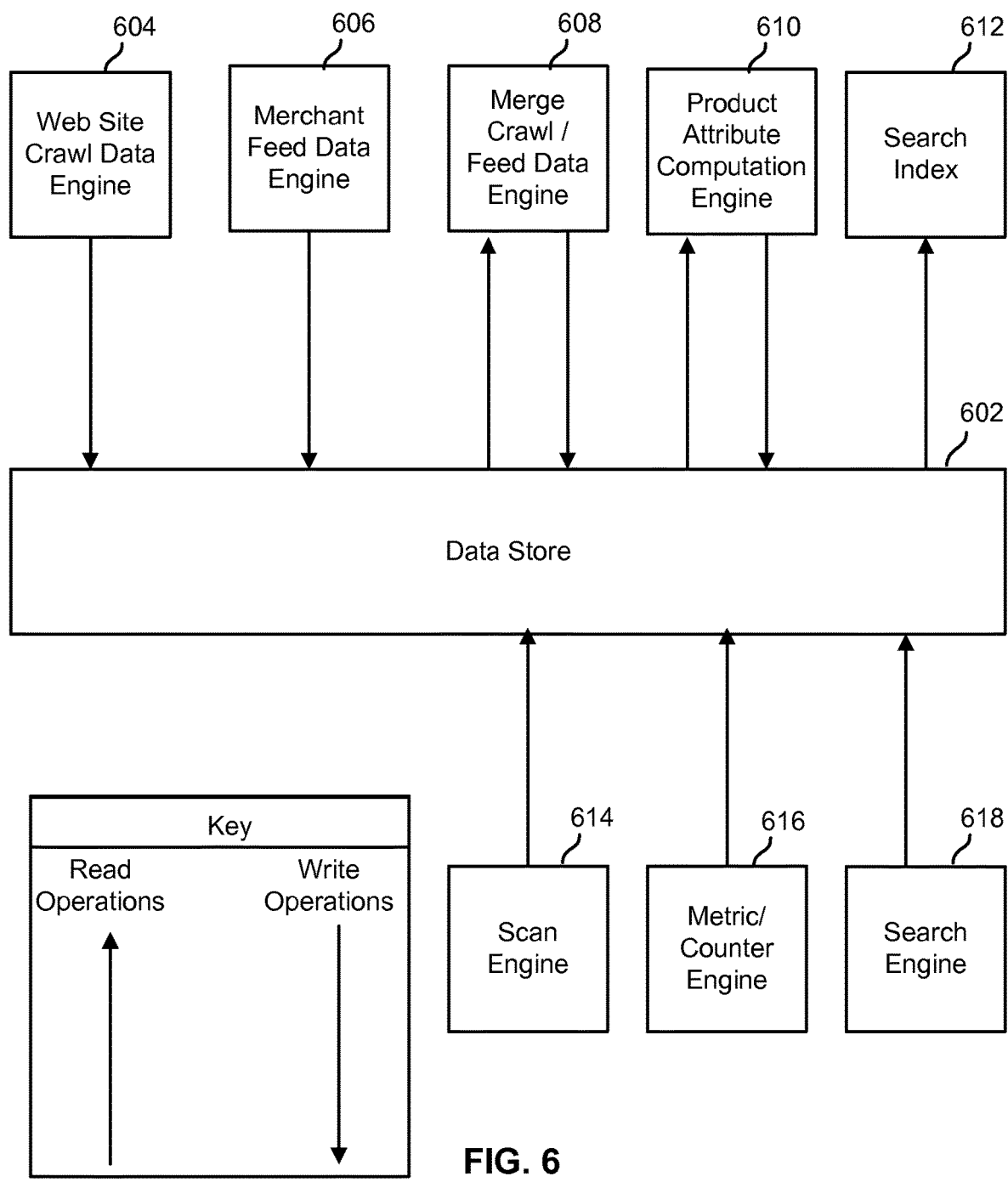
FIG. 6 is a functional block diagram illustrating a data storage layer in communication with a web search related application in accordance with some embodiments.

FIG. 6 is a functional block diagram illustrating a data storage layer in communication with a web search related application in accordance with some embodiments. In particular, a web search related application interacts with the data storage layer as similarly shown in and described above with respect to FIG. 5.

A canon key as used herein generally refers to a canonical representation of a URL. Pagedata as used herein generally refers to a canonical representation of a web page. In some cases, pagedata can be retrieved from the HTML content of the web page. In the case of the merchant data feed, pagedata

```
DataCenter: pagedb-front-end:
ColumnFamily : \w+[.]m4042_product
Exclusion Rule : * // Remove all
ColumnFamily: \w+[.]sears_thematic
Exclusion Rule : *
ColumnFamily: \w+[.]m\d\d\d\d_product
Exclusion Rule : b_paa,c_url_flags,s_deleted,s_status_tags
ColumnFamily: \w+[.]\w+_thematic
Exclusion Rule : crumb_nav,left_nav,theme_rank,rendered_page
ColumnFamily: \w+[.]br5057_product
Exclusion Rule :
b_paa,b_page,c_canon_key,c_canon_url,c_url_flags,cat_crumbs,cat_goog,cat_nodes,d_age_group,
d_brand,d_color_group,d_colors,d_conditions,d_description,d_flags,d_gender,d_keywords,
d_la_img_urls,d_material,d_mature,d_model_name,d_others,d_pattern,d_sizes,d_stores,d_sw_img_urls,
d_th_img_urls,d_title,d_urls,d_zo_img_urls,i_buyable,i_have_avail,i_have_local_avail,
i_last_avail_ts,i_level,i_status,l_first_live_ts,l_is_live,l_last_live_ts,l_launch_ts,pg_i_refs,pg_o_refs,
pg_type,s_deleted,s_status_tags
ColumnFamily: \w+[.]br4042_product
Exclusion Rule:
b_paa,b_page,c_canon_key,c_canon_url,c_url_flags,cat_crumbs,cat_goog,cat_nodes,d_age_group,
d_brand,d_color_group,d_colors,d_conditions,d_description,d_flags,d_gender,d_keywords,
d_la_img_urls,d_material,d_mature,d_model_name,d_others,d_pattern,d_sizes,d_stores,d_sw_img_urls,
d_th_img_urls,d_title,d_urls,d_zo_img_urls,i_buyable,i_have_avail,i_have_local_avail,
i_last_avail_ts,i_level,i_status,l_first_live_ts,l_is_live,l_last_live_ts,l_launch_ts,pg_i_refs,pg_o_refs,
pg_type,s_deleted,s_status_tags
```

In one embodiment, user requests to the front-end are prioritized over back-end processing to facilitate performance and service for user requests for applications/services provided by the data storage layer service provider. For example, another mechanism through which latencies for can be constructed from the information provided in the merchant data feed. Generally, pagedata provides a set of attributes describing a given web page. In the data store, the primary key for look-up as used herein generally refers to the canon key. A row in the data store as used herein generally refers to a tuple containing all attributes corresponding to a given primary key. A title of a web page in some cases can be defined as the HTML element defined by the tag <title>. A heading of a web page in some cases can be defined as the HTML element defined by tag <h1>. A query can generally be defined as a collection of words separated by white spaces.

In some embodiments, a web page is classified using the below described categories of web pages. A product web page generally represents an individual item that may be offered for sale by a third-party merchant. A category web page generally represents a collection of products. In some cases, these web pages can be manually generated or undergo a quality procedure to ensure high quality. A search web page generally represents a collection of products that is generated dynamically based on a search query. Other web pages generally represent any web page that does not belong to any of the above categories.

Referring to FIG. 6, an example web search related application can perform the following behaviors that include performing various read and write operations from and to data store 602 as further described below.

A merchant web site crawl data engine 604 crawls/acquires web pages from the WWW crawled data including a merchant web site. For example, merchant web site crawl data engine 604 can parse the HTML content of a web page and store a canonical representation as pagedata. In particular, this crawl related pagedata can be stored in data store 602 using a canon key as the primary key.

A merchant feed data engine 606 parses a merchant data feed provided by the merchant. For example, merchant feed data engine 606 can store a canonical representation of each item in the merchant data feed as pagedata. In particular, this merchant feed related pagedata can be stored in data store 602 using a canon key as the primary key.

A merge crawl/feed data engine 608 performs a merge operation. In one embodiment, a merge operation includes a process of merging attributes for the same canon key from different sources, including, for example, crawl data from the WWW crawled data and the merchant feed data. For example, a sample attribute for a product is a price attribute that represents the price for sale of the product. In some cases, it may be possible that a price retrieved from WWW crawl data is different from the price retrieved from feed data for the same canon key. In this case, the merge process can be performed to compute a final value for the price attribute from all data sources to ensure data consistency as similarly described above. The merged crawl/feed data is then stored in data store 602.

A product attribute computation engine 610 computes product attributes for each product in a given merchant's data sources. In an example implementation, for all pages, product attribute computation engine 610 reads crawl pagedata and feed pagedata from the data store, and computes merged pagedata using the merge process as similarly described above. For all products, product attribute computation engine 610 then reads the merged pagedata and computes product attributes. The computed product attributes for each product for the merchant are then stored in data store 602.

A search index 612 is generated for the merchant related data in data store 602 as similarly described above. In an example implementation, for all pages in data store 602, a reverse search index is automatically generated to facilitate searching of the merchant related data by any attribute, such as similarly described above. For example, the search index can allow for searching all products that contain the query "green lace dress" in a title or heading field or in a description for the web page.

A scan engine 614 is in communication with data store 602. For example, various applications/services can utilize the merchant product information stored in data store 602 of the data storage layer to perform scans using scan engine 614 of all merchant products to facilitate various applications/services, such as similarly described above.

A metric/counter engine 616 is in communication with data store 602. For example, metric/counter engine 616 can determine various metrics or counters of data items (e.g., merchant products or other information) stored in data store 602, such as similarly described above.

A search engine 618 is in communication with data store 602. For example, search engine 618 can perform a search of data items (e.g., merchant products or other information) stored in data store 602 using the reverse search index to perform reverse index look-up operations or other search operations, such as similarly described above.

Figure 7:
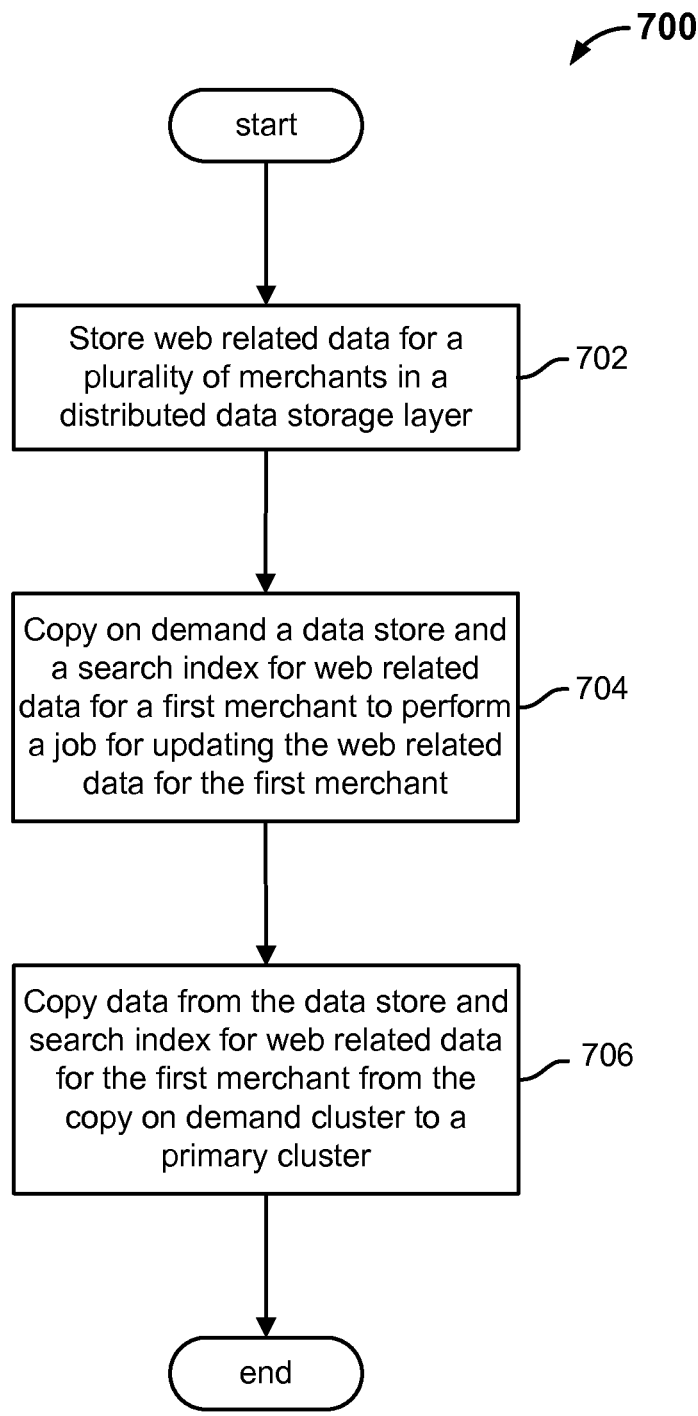
FIG. 7 is a flow diagram illustrating the process for providing a distributed and fast data storage layer for large scale web data services in accordance with some embodiments.

FIG. 7 is a flow diagram illustrating the process for providing a distributed and fast data storage layer for large scale web data services in accordance with some embodiments. In one embodiment, process 700 is performed by a distributed data storage layer, such as described above with respect to FIGS. 1-6.

The process begins at 702. At 702, storing web related data for a plurality of merchants in a distributed data storage layer is performed. For example, the web related data can include crawled web site data, feed data, and/or user behavior data for each of the plurality of merchants.

At 704, copying on demand a data store and a search index for web related data for a first merchant to perform a job for updating the web related data for the first merchant is performed. For example, a copy on demand data store and search index can be provided by capturing a snapshot of the data and the search index in a dynamic cluster, which can be used to facilitate improved scalability of back-end job processing of merchant data, such as similarly described above.

At 706, copying data from the data store and search index for web related data for the first merchant from the copy on demand cluster (e.g., dynamic cluster) to a primary cluster. For example, data from the copy on demand search index and data store, which is stored in the copy on demand cluster (e.g., dynamic cluster), can be copied to the primary cluster (e.g., main cluster), which can be used for performing front-end processing operations of merchant data, such as similarly described above.

Figure 8:
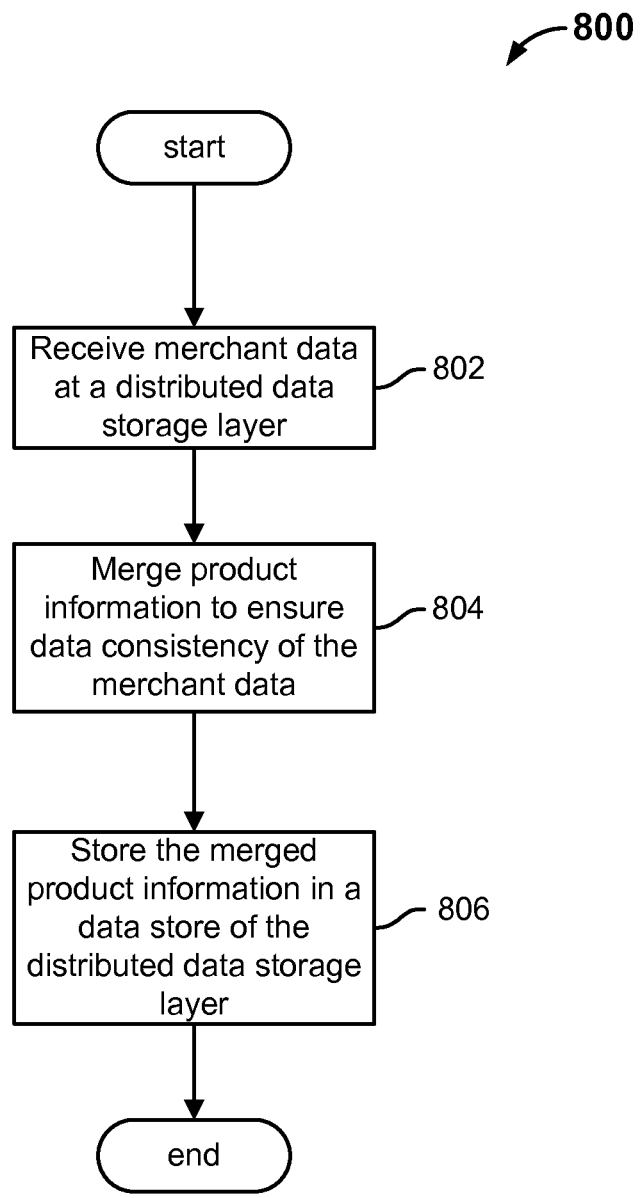
FIG. 8 is another flow diagram illustrating the process for providing a distributed and fast data storage layer for large scale web data services in accordance with some embodiments.

FIG. 8 is another flow diagram illustrating the process for providing a distributed and fast data storage layer for large scale web data services in accordance with some embodiments. In one embodiment, process 800 is performed by a distributed data storage layer, such as described above with respect to FIGS. 1-6.

The process begins at 802. At 802, merchant data is received at a distributed data storage layer. For example, the merchant data can include crawled web site data, feed data, and/or user behavior data for each of the plurality of merchants.

At 804, merging product information is performed to ensure data consistency of the merchant data stored at the distributed data storage layer. For example, assume that a price retrieved from the WWW crawl data is different from the price retrieved from feed data for the merchant data. In this case, the product information can be merged to determine a final value for price from all data sources to ensure data consistency, such as using various techniques as similarly described above.

At 806, merged product information is stored in a data store of the distributed data storage layer. For example, the merged product information can be stored in a data store of a back-end cluster of the distributed data storage layer.

Figure 9:
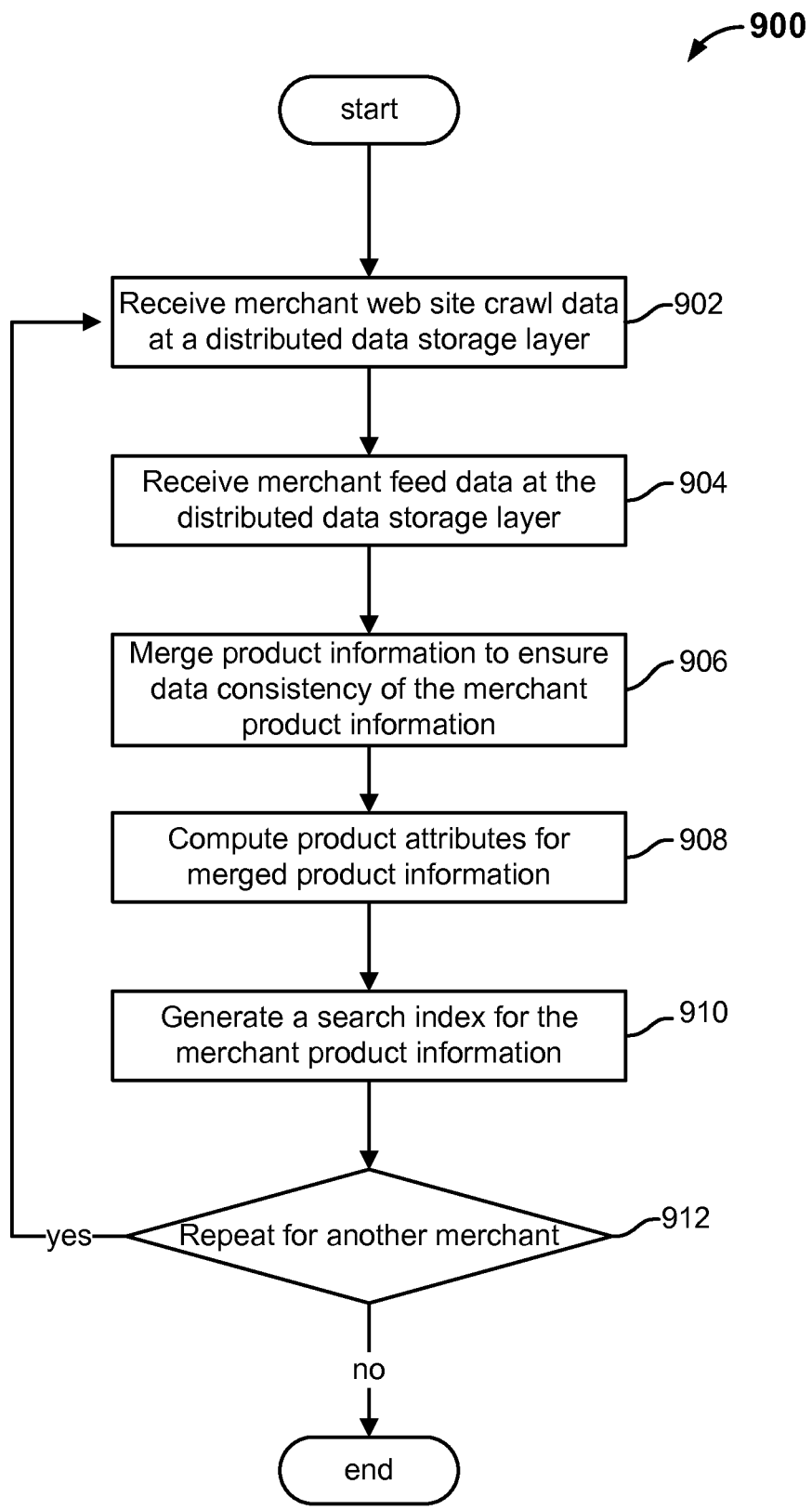
FIG. 9 is another flow diagram illustrating the process for providing a distributed and fast data storage layer for large scale web data services in accordance with some embodiments.

FIG. 9 is a flow diagram illustrating the process for providing a distributed and fast data storage layer for large scale web data services in accordance with some embodiments. In one embodiment, process 900 is performed by a distributed data storage layer, such as described above with respect to FIGS. 1-6.

The process begins at 902. At 902, merchant web site crawl data is received at a distributed data storage layer. For example, the merchant data can include crawled web site data, which can also include user behavior data for each of the plurality of merchants.

At 904, merchant feed data is received at the distributed data storage layer. For example, the merchant feed data can include product information, such as (a subset of) a product catalog (e.g., in an XML or other data format).

At 906, merging product information is performed to ensure data consistency of the merchant product information at the distributed data storage layer. For example, assume that a price retrieved from the WWW crawl data is different from the price retrieved from feed data for the merchant data. In this case, the product information can be merged to determine a final value for price from all data sources to ensure data consistency, such as using various techniques as similarly described above.

At 908, product attributes are computed for the merged product information. For example, merged pagedata can be computed using the merge process as similarly described above. For all products, the merged pagedata can then be used to compute product attributes for each product offered for sale by the merchant.

At 910, a search index is generated for the merchant product information (e.g., the merged merchant product information). For example, a reverse search index can be automatically generated to facilitate searching of the merchant related data by any attribute, such as similarly described above.

At 912, whether the process is to be repeated for another merchant is determined. If so, processing returns to 902. If not, then the process is completed (e.g., until new or updated merchant data is received at the distributed data storage layer).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a distributed data storage layer for web data services, comprising:
the distributed data storage layer configured to store web related data for a plurality of merchants;
a copy on demand dynamic cluster including a data store and a search index configured to store web related data for each of the plurality of merchants to perform a job for updating the web related data for each of the plurality of merchants using a processor;
a merge product information engine configured to:
merge crawled web site data and feed data for each of the plurality of merchants, the plurality of merchants including a first merchant and a second merchant, wherein the merging of the crawled web site data and feed data for each of the plurality of merchants comprises to:
merge crawled web site data and feed data for the first merchant to obtain a first merged data; and
merge crawled web site data and feed data for the second merchant to obtain a second merged data, wherein the first merged data is isolated from the second merged data; and
maintain data consistency for the crawled web site data and feed data for each of the plurality of merchants, comprising to:
determine whether a first value of an attribute associated with a product in the crawled web site data matches a second value of the attribute associated with the product in the feed data; and
in response to a determination that the first value does not match the second value, store the second value as a value for the merged attribute associated with the product in the search index;
a resource aware adaptive capacity/throttling engine configured to:
determine resource requirements for performing back-end job processing for each of the plurality of merchants based on one or more rules, comprising to:
perform one or more of the following:
determine whether a resource requirement exceeds a quota per application or fails to satisfy a service level agreement (SLA) for a merchant; or
determine whether the resource requirement exceeds a dynamic rate limit; and
in response to a determination that the resource requirements satisfy the one or more rules for at least one merchant of the plurality of merchants, copy data from the data store and the search index to a copy on demand cluster to perform processing on the copied data for the at least one merchant, and perform back-end job processing for the remaining merchants of the plurality of merchants;
a resource manager configured to, for at least one merchant of the plurality of merchants, optimize for a least expensive computation resource for performing a given job; and
a search engine configured to provide a search result to a query based at least in part on the search index.

2. The system recited in claim 1, wherein the copy on demand dynamic cluster including the data store and the search index for storing the web related data for the first merchant corresponds to a snapshot of the data store and the search index stored in the dynamic cluster of the distributed data storage layer.

3. The system recited in claim 1, wherein the web related data for the plurality of merchants is stored in a back-end cluster of the distributed data storage layer.

4. The system recited in claim 1, wherein the web related data for the plurality of merchants is stored in a back-end cluster of the distributed data storage layer, and wherein the web related data includes crawled web site data, feed data, and user behavior data.

5. The system recited in claim 1, wherein the distributed data storage layer merges and stores crawled web site data and feed data for each of the plurality of merchants.

6. The system recited in claim 1, further comprising:
an application that is in communication with the distributed data storage layer and a web site associated with the first merchant.

7. The system recited in claim 1, further comprising:
an application that is in communication with the distributed data storage layer and a web site associated with the first merchant, wherein the application is also in communication with a user browser.

8. The system recited in claim 1, further comprising:
a back-end job manager for delegating jobs for processing by a back-end cluster or the copy on demand dynamic cluster.

9. The system recited in claim 1, wherein the resource manager is further configured to optimize for the least expensive computation resource for a cluster size for at least one of the following: a back-end cluster or the copy on demand dynamic cluster for performing back-end job processing, and
wherein optimization for performing the given job, the back-end cluster, or the copy on demand dynamic cluster for performing back-end job processing is based on fluctuations in a spot price of an instance on a market price, the spot price computed as an average over time.

10. The system recited in claim 1, further comprising:
the front-end cluster for storing a subset of the web related data for each of the plurality of merchants in the distributed data storage layer.

11. A method of a distributed data storage layer for web data services, comprising:
storing web related data for a plurality of merchants in the distributed data storage layer;
copying on demand a data store and a search index for web related data for each of the plurality of merchants to perform a job for updating the web related data for each of the plurality of merchants;
merging crawled web site data and feed data for each of the plurality of merchants, the plurality of merchants including a first merchant and a second merchant, wherein the merging of the crawled web site data and feed data for each of the plurality of merchants comprises:
merging crawled web site data and feed data for the first merchant to obtain a first merged data; and
merging crawled web site data and feed data for the second merchant to obtain a second merged data, wherein the first merged data is isolated from the second merged data;
maintaining data consistency for the crawled web site data and feed data for each of the plurality of merchants, comprising:
determining whether a first value of an attribute associated with a product in the crawled web site data matches a second value of the attribute associated with the product in the feed data; and
in response to a determination that the first value does not match the second value, storing the second value as a value for the merged attribute associated with the product in the search index;
determining resource requirements for performing back-end job processing for each of the plurality of merchants based on one or more rules, comprising:
performing one or more of the following:
determining whether a resource requirement exceeds a quota per application or fails to satisfy a service level agreement (SLA) for a merchant; or
determining whether the resource requirement exceeds a dynamic rate limit;
in response to a determination that the resource requirements satisfy the one or more rules for at least one merchant of the plurality of merchants, copying data from the data store and the search index to a copy on demand cluster to perform processing on the copied data for the at least one merchant, and performing back-end job processing for the remaining merchants of the plurality of merchants;
optimizing for at least one merchant of the plurality of merchants a least expensive computation resource for performing a given job a resource manager; and
providing a search result to a query based at least in part on the search index.

12. The method of claim 11, wherein the copy on demand of the data store and the search index for storing the web related data for the first merchant corresponds to a snapshot of the data store and the search index in a dynamic cluster.

13. The method of claim 11, wherein the web related data for the plurality of merchants is stored in a back-end cluster of the distributed data storage layer.

14. A computer program product for a distributed data storage layer for web data services, the computer program product being embodied in a non-transitory computer readable storage medium and comprising computer instructions for:
storing web related data for a plurality of merchants in the distributed data storage layer;
copying on demand a data store and a search index for web related data for each of the plurality of merchants to perform a job for updating the web related data for each of the plurality of merchants;
merging crawled web site data and feed data for each of the plurality of merchants, the plurality of merchants including a first merchant and a second merchant, wherein the merging of the crawled web site data and feed data for each of the plurality of merchants comprises:
merging crawled web site data and feed data for the first merchant to obtain a first merged data; and
merging crawled web site data and feed data for the second merchant to obtain a second merged data, wherein the first merged data is isolated from the second merged data;
maintaining data consistency for the crawled web site data and feed data for each of the plurality of merchants, comprising:
determining whether a first value of an attribute associated with a product in the crawled web site data matches a second value of the attribute associated with the product in the feed data; and
in response to a determination that the first value does not match the second value, storing the second value as a value for the merged attribute associated with the product in the search index;
determining resource requirements for performing back-end job processing for each of the plurality of merchants based on one or more rules, comprising:
performing one or more of the following:
determining whether a resource requirement exceeds a quota per application or fails to satisfy a service level agreement (SLA) for a merchant; or
determining whether the resource requirement exceeds a dynamic rate limit; and
in response to a determination that the resource requirements satisfy the one or more rules for at least one merchant of the plurality of merchants, copying data from the data store and the search index to a copy on demand cluster to perform processing on the copied data for the at least one merchant, and performing back-end job processing for the remaining merchants of the plurality of merchants;

optimizing for at least one merchant of the plurality of merchants for a least expensive computation resource for performing a given job a resource manager; and providing a search result to a query based at least in part on the search index.

15. The computer program product recited in claim 14, wherein the copy on demand of the data store and the search index for storing the web related data for the first merchant corresponds to a snapshot of the data store and the search index in a dynamic cluster.

16. The computer program product recited in claim 14, wherein the web related data for the plurality of merchants is stored in a back-end cluster of the distributed data storage layer.

17. The system recited in claim 1, wherein the attribute relates to price.

18. The system recited in claim 1, wherein the SLA for a merchant comprises an update to merchant pricing within a specified time frame.

19. The method of claim 11, wherein the SLA for a merchant comprises an update to merchant pricing within a specified time frame.

20. The computer program product recited in claim 14, wherein the SLA for a merchant comprises an update to merchant pricing within a specified time frame.

* * * * *